United States Patent [19]

Casabona et al.

[11] Patent Number: 5,712,641
[45] Date of Patent: Jan. 27, 1998

[54] INTERFERENCE CANCELLATION SYSTEM FOR GLOBAL POSITIONING SATELLITE RECEIVERS

[75] Inventors: Mario M. Casabona, Cedar Grove; Murray W. Rosen, Parsippany, both of N.J.; George A. Silverman, Bensalem, Pa.

[73] Assignee: Electro-Radiation Incorporated, Fairfield, N.J.

[21] Appl. No.: 608,493

[22] Filed: Feb. 28, 1996

[51] Int. Cl.$^6$ .................... H01Q 21/06; H01Q 21/24; H04B 7/10
[52] U.S. Cl. .................... 342/362; 342/372; 342/373; 342/364
[58] Field of Search ........................ 342/357, 362, 342/363, 364, 365, 366, 372, 373

[56] References Cited

U.S. PATENT DOCUMENTS

| | | |
|---|---|---|
| 3,421,691 | 1/1969 | Brown et al. |
| 3,883,872 | 5/1975 | Fletcher et al. |
| 4,283,795 | 8/1981 | Steinberger. |
| 5,298,908 | 3/1994 | Piele. |
| 5,485,485 | 1/1996 | Briskman et al. ............ 375/200 |
| 5,515,057 | 5/1996 | Lennen et al. .............. 342/357 |

*Primary Examiner*—Theodore M. Blum
*Attorney, Agent, or Firm*—Jacobson, Price, Holman & Stern, PPLC

[57] ABSTRACT

An adaptive polarization cancellation arrangement which nulls out all types of concurrent interference signals received by a Global Positioning System (GPS) receiver from antenna mainlobe and sidelobe situated sources. The orthogonally polarized components of the composite received signal are separated by the receive antenna arrangement and adjusted in the polarization feed adapter network between the antenna and GPS receiver to optimally cancel components. The antenna and installation arrangement creates a polarization filter relative to interference sources which changes their apparent polarization orientation and supports adaptive discrimination based on dissimilar polarization characteristics relative to the desired signals. The orthogonal received signal components from the GPS satellite constellation and from interference sources are combined to adaptively create cross-polarization nulls that adequately attenuate interference sources while slightly modifying the GPS received signals. The present network can also improve GPS signal levels and signal to noise ratio by polarization optimization or matching in noninterference environments.

15 Claims, 17 Drawing Sheets

DUAL ORTHO BI-FREQUENCY ANTENNA CONFIGURATIONS
L1 & L2 BAND CANCELLERS

DUAL ORTHO BI-FREQUENCY ANTENNA CONFIGURATIONS
L1 BAND CANCELLER + L2 BAND BYPASS

L1 AND L2 BAND FREQUENCY MULTIPLEXED CANCELLERS (MINIMUM INTERFACE)

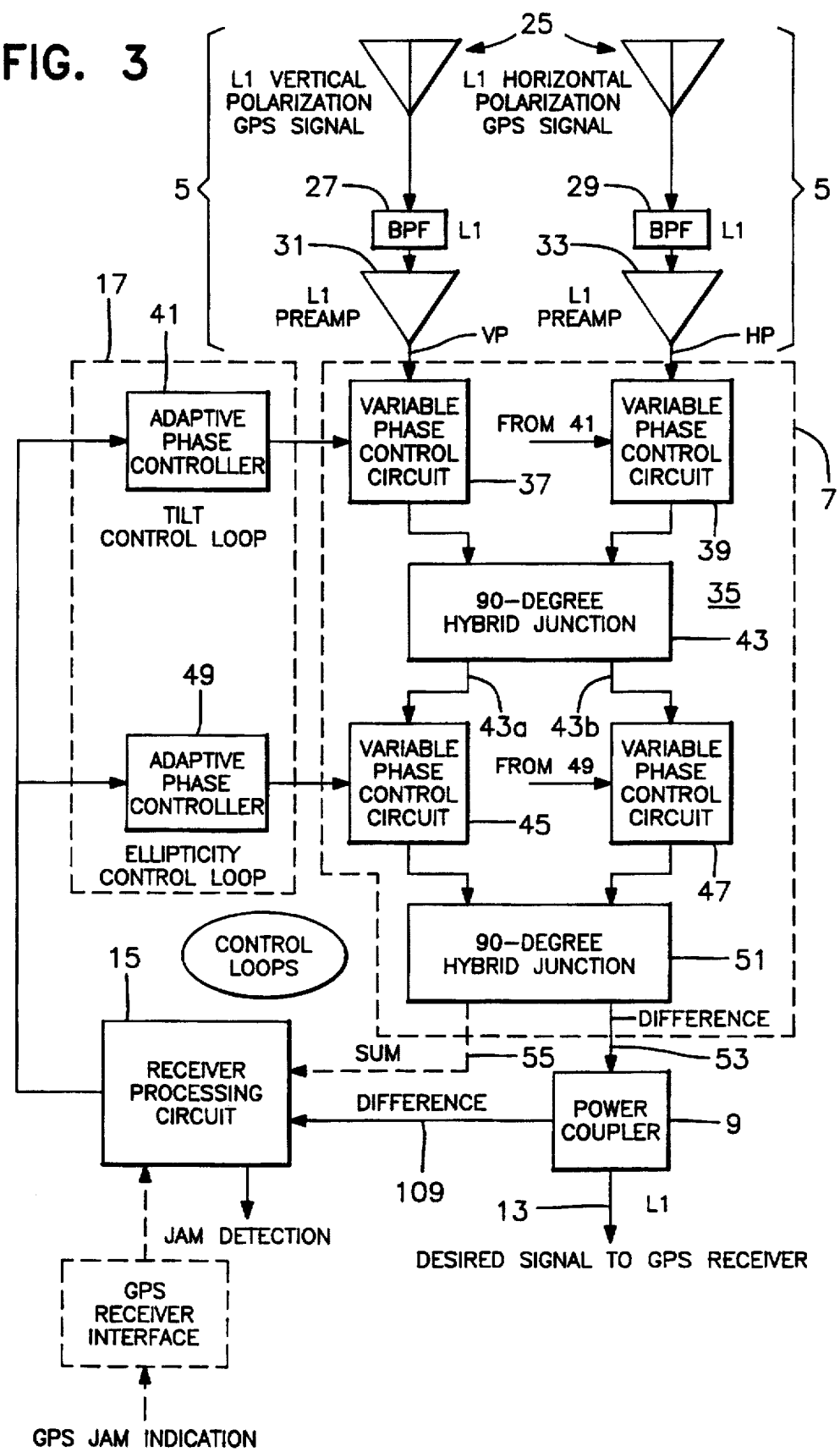

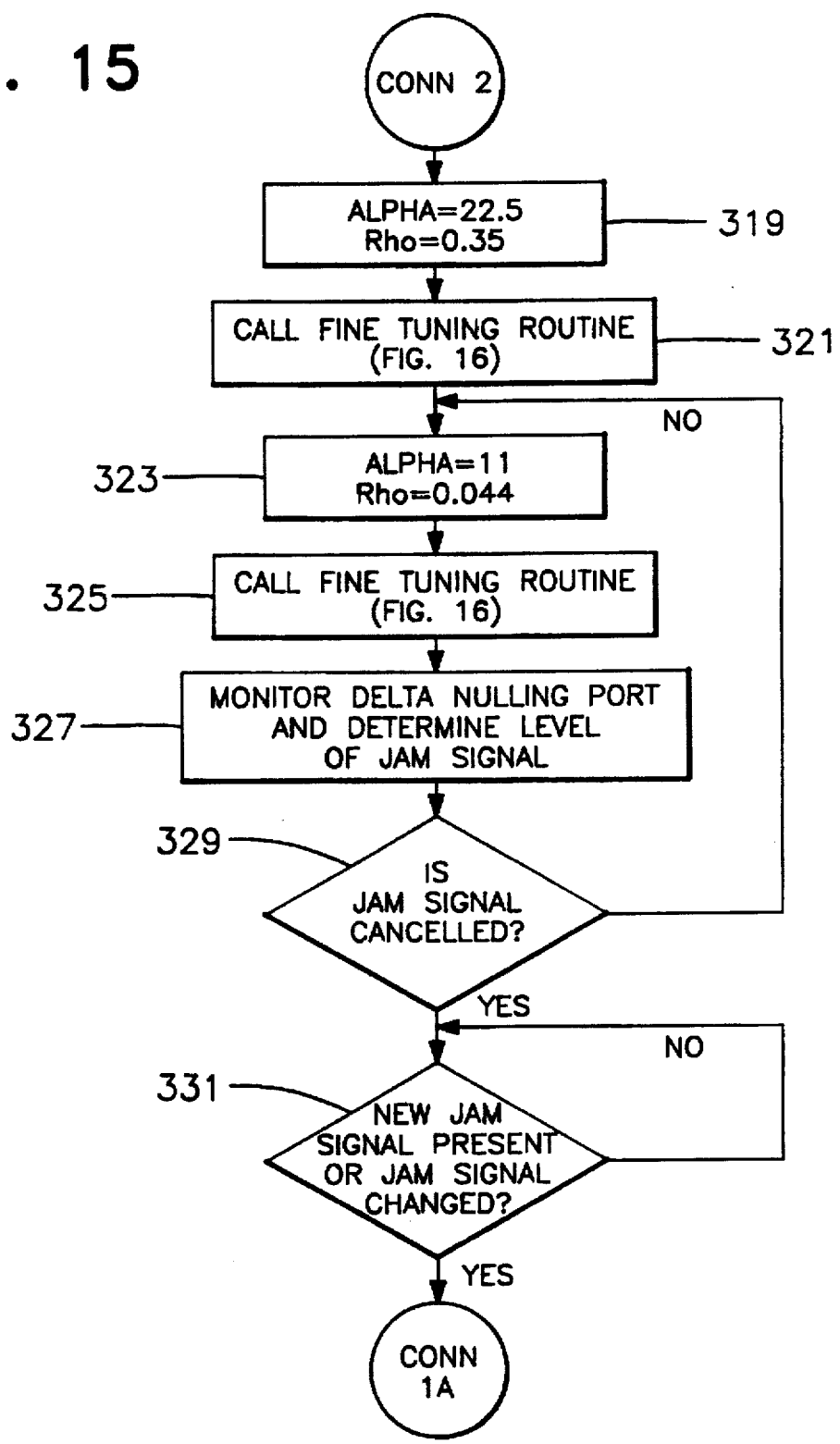

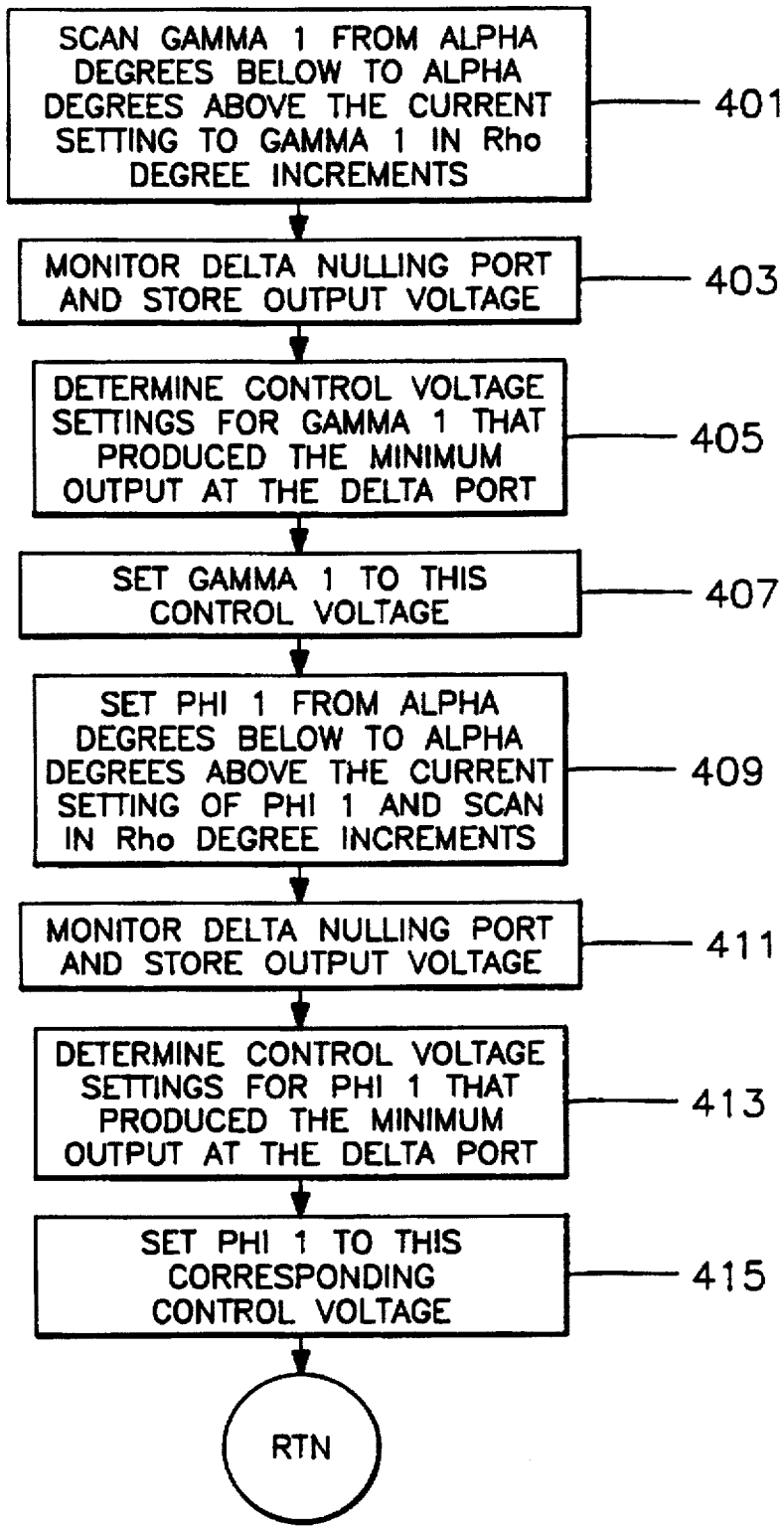

INTERFERENCE CANCELLATION SYSTEM FOR GLOBAL POSITIONING SATELLITE RECEIVERS

BACKGROUND OF THE INVENTION

1. Field of the Invention

The present invention relates to a nulling and cancellation system for Global Positioning System (GPS) receivers adapted to suppress inband interference and/or denial jamming signals in the GPS L1 and L2 frequency bands. More specifically, the present invention relates to the reception of orthogonally polarized electric field vectors and to methods of receiving these components with high cross-polarized isolation, and to the methods of attenuating interference and/or jamming signals using adaptive polarization mismatching of the antenna feed signal received by the victim GPS receiver. The present invention suppresses interference and/or jamming by significantly reducing the jammer-to-signal (J/S) ratio seen by the GPS receiver.

2. Description of the Prior Art

The Global Positioning System (GPS) [also called NAVSTAR] is a satellite navigation aiding system which transmits digitally coded data used to determine 2 and 3-dimensional position fixes at a receiving antenna. Its purpose is to provide users with high accuracy position, velocity and universal time throughout the world at low cost. For this reason, reliable GPS operability in an interference environment is valuable for both military and civilian applications.

The key to achieving precise navigational performance is the processing of a very weak GPS spread spectrum signal which carries coarse acquisition (C/A) and precision (P(Y)) digitally coded and encrypted data, typically −120 dBm to −136 dBm (isotropic). The GPS signal spectrum uses two L-band frequencies, L1 at 1575.42 MHz and L2 at 1227.60 MHz, with bandwidths of either 2.05 MHz for C/A code or 20.46 MHz for P(Y) code, and employs right hand circular polarization (RHCP) for both L1 and L2 to simplify user dependence on receive antenna orientation. The C/A and P(Y) codes are on L1, the P(Y) code is on L2. Theoretical processing gains for the C/A and P(Y) codes are 43 dB and 53 dB, respectively. The critical GPS receiver reception states are: C/A code acquisition; P code direct acquisition; P code track; and P code carrier aided track.

The GPS digital data can be detected and processed even if RF carrier reception is prevented by interference, but higher accuracy is attained when the signal carrier is available. This is generally possible because the GPS concept has inherent antijam (AJ) capability, however the low receive signal level makes GPS vulnerable to low power interference and/or jamming. It is relatively easy for a local inband source to overwhelm the GPS signal, preventing successful processing of the digital data. As a result, the GPS system has several identified susceptibilities and vulnerabilities to interference. From both military and civilian perspectives, it is important to establish an adequate anti-jam capability for GPS systems and ensure availability of this asset in all environments. This was recognized by the military and resulted in the development of several spatial nulling and/or beam forming antennas and digital filtering concepts.

GPS receivers have exhibited different levels of vulnerability to interference and jamming emitter waveform types, including: broadband Gaussian noise, continuous wave (CW), swept CW, pulsed CW, amplitude modulated (AM) CW, phase shift keying (PSK) pseudo noise, narrowband and wideband frequency modulated signals, etc. Vulnerability is highly scenario and receiver mode dependent. Broadband Gaussian noise is the most critical interference type in the above group because of the difficulty in filtering broadband noise without concurrent GPS quieting, and the intrinsic high cost and performance impact associated with spatial filtering, i.e. null steering, solutions on a moving platform.

The use of phase nulling is generally known in the prior art although the use of polarization converted to phase for GPS interference nulling applications is not known.

It is desirable to provide an interference cancelling system for GPS systems that can deal with complex interference environments composed of diverse interference and/or jamming waveform types, L1 and/or L2 interference, multiple interference sources, and different interference polarizations. It is further desired that the interference cancelling system provide high levels of cancellation for either or both of the GPS operating frequencies and adapt to variation in orientation of the receiver antenna(s) and/or the interference source.

SUMMARY OF THE INVENTION

One object of the present invention is to provide an interference nulling system for GPS which exploits the differences in apparent polarization of the right hand circular polarization GPS signals and interference sources, and to suppress inband interference and jamming signals in the GPS L1 and L2 frequency bands.

It is a further object of the present invention is to provide an antenna system that processes the orthogonal elements of the interference signal(s) and of the GPS signals with a high degree of cross-polarization isolation and to adaptively cross-polarize the antenna system and null the interference.

Another object of the present invention is to receive the interference signals using one port of an adaptive antenna feed circuit having an RF polarimeter structure and to sample the interference signal so as to modulate the combined interference signals and GPS signals and to null out the interference signal in the port to the GPS receiver.

Still further, a general object of the present invention is to provide an orthogonal polarization receive antenna structure having a compact form, a low profile, and capable of processing the L1 and L2 GPS signals independently.

It is another general object of the present invention to provide a nulling system capable of cancelling multiple interference sources having a coherent relationship that allows vector summation, and to cancel multiple interference sources having similar polarizations.

Yet another general object of the present invention is to detect the interference signals and control the adaptive cross-polarization nulling system without the need to process the GPS signal.

Another general object of the present invention is to partition the antenna and adaptive cross-polarization nulling circuits such that the antenna subsystem may be remotely located and powered, and that the electrical interface between these functional elements be composed of a minimum number of RF coaxial or fiber optic cables and wires.

Another general object of the present invention is to utilize multiple implementation configurations and system modularity which address individual requirements to process interference in L1 only, L2 only, L1 and L2, L1 with L2 bypassed, etc.

It is another general objective of the present invention to present an installed insertion loss/gain to the GPS receiver that improves GPS receiver performance range.

According to these and other objects of the present invention, there is provided a high quality orthogonal polarization receive antenna system that decomposes the received L-band environment into the apparent orthogonal polarization signals representative of the GPS signal and inband interference sources. The orthogonal components of the received environment are filtered, amplified and transmitted from the antenna system to the nulling system in each GPS band using separate cables. In the ease of the L2 bypass configuration, the right hand circular polarization signal may be developed at the antenna and transmitted. A sample of the interference signal in each band of the GPS channel is detected and processed to identify interference conditions and to produce control signals that are applied to the adaptive antenna feed circuits in each band of interest that control the effective tilt angle and ellipticity (or axial ratio) of the combined antenna system. The effective polarization property of the antenna system is controlled so as to cross-polarize or mismatch the antenna to the interference source and thus null or suppress the interference signal in the channel containing the GPS signals. In configurations where L1 and L2 bands are processed separately, they are recombined after independent nulling, and provided to the victim GPS receiver. The detection and control loops are optimized to identify and acquire interference signals and to rapidly modulate the fit and ellipticity properties of the adaptive system to a null. Adaptation includes variation to polarization properties, polarization orientation, fading, maneuver variations, etc. Under a no interference condition, each adaptive L1/L2 loop can be configured so that the effective polarization property of the antenna system to the preferred right hand circular polarization for optimum receipt of the GPS signal using the GPS receiver.

BRIEF DESCRIPTION OF THE DRAWINGS

FIG. 3 illustrates preferred embodiment of a single channel dual ortho antenna configuration for nulling of L1 (or L2) interference only.

FIGS. 14, 15 and 16 illustrate the GPS interference canceler control algorithm for detecting and cancelling interference.

DESCRIPTION OF THE PREFERRED EMBODIMENTS

Figure 1:
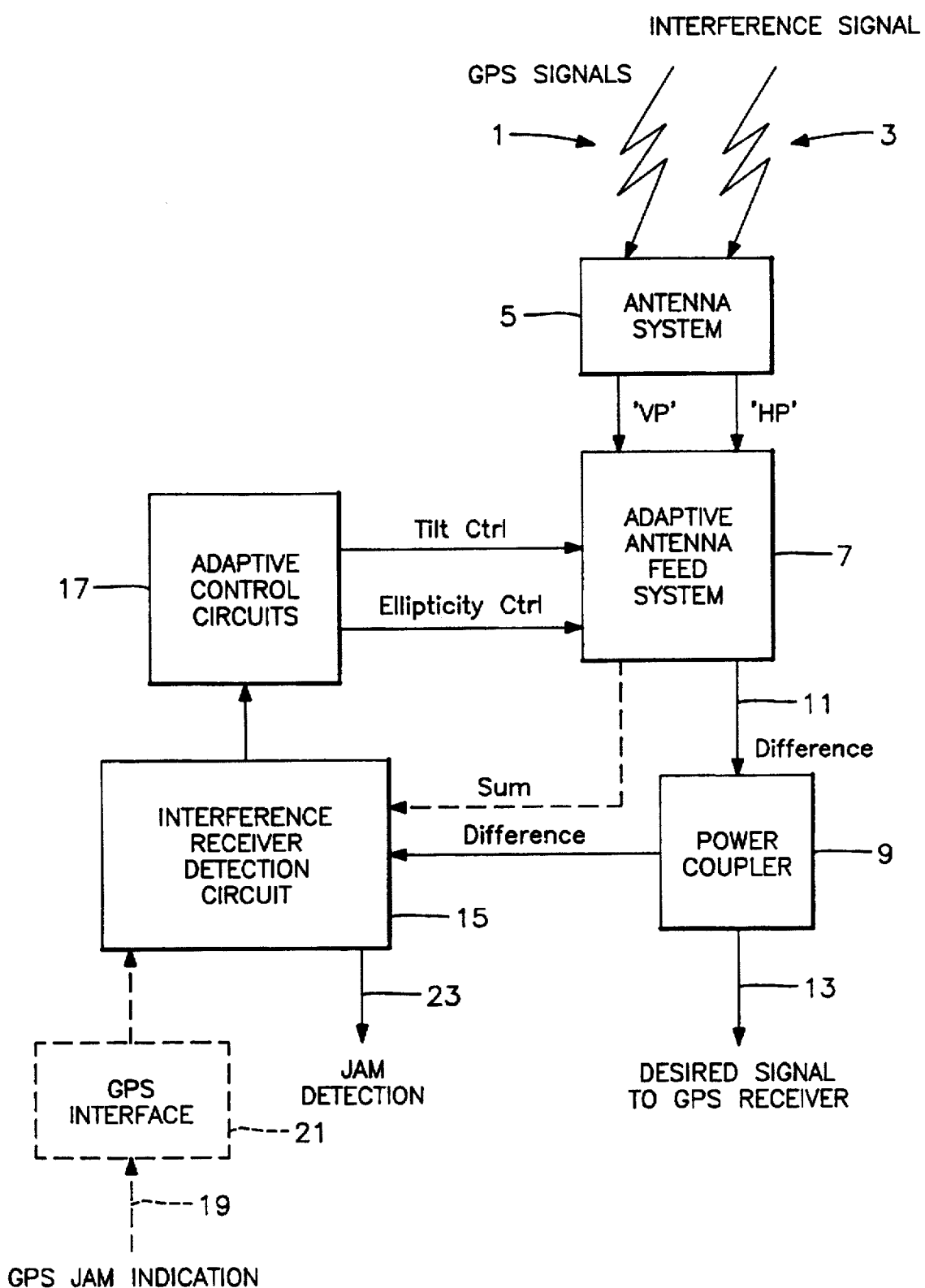
FIG. 1 is a top-level block diagram showing the adaptive cross-polarization interference cancellation system for GPS signals.

A top-level block diagram showing the adaptive cross-polarization interference cancellation system for GPS signals is shown in FIG. 1. The diagram illustrates one channel or band of the invention showing the cancellation concept and illustrating the received signal composed of the combined GPS signals 1 and the interference or jamming signal 3. The received signal 1, 3, consisting of the GPS signals and the interference signals, is received by the antenna system 5 which effectively divides the received signals into orthogonal components VP and HP (vertically polarized and horizontally polarized) signals to the adaptive antenna feed system 7. A power coupler 9 samples the difference port 11 of the network which provides the difference signal to the GPS receiver (not shown) via 13. An interference receiver detection circuit 15 receives and processes the difference signal and provides the signal to adaptive control circuits 17 that control the phase modulators within the adaptive antenna feed system 7 for tilt and ellipticity. The loop doses on interference to cross-polarize the feed and to null the interference to the GPS receiver. The GPS receiver may, optionally, provide a jam indication enable signal 19, via a GPS interface 21, to enable or disable the receiver circuit 15. When enabled, a "jam detection" signal 23 may be provided back to the GPS receiver.

For purposes of explaining the operation of the present invention for nulling a signal, it is assumed that all received signals, GPS signals 1 and interference signal 3, are composed of vertical and horizontal polarized waves. The theory supporting the ortho polarization hulling concept used in the invention is based on the property that any wave of arbitrary polarization can be synthesized or decomposed from/into two waves orthogonally polarized to each other. For example, a circularly polarized wave can be produced by the coexistence of a vertically and a horizontally polarized wave, each having the same amplitude and with a 90-degree phase difference. A linearly polarized wave can be produced by the coexistence of a vertically and a horizontally polarized wave, with a 0-degree phase difference. Thus, orthogonal polarization antennas can be used to match or mismatch a propagated signal using relative phase and amplitude modulations to combine the ortho components. For the case of an interference signal, the orthogonal polarization antennas within the antenna system 5 can be used to mismatch the receiving system and effectively null the signal. This mismatch null would have an impact on other signals in the environment, including the desired GPS signals, by creating conditions in the antenna that could range from a perfect match to a mismatch as well.

The loss, null or mismatch achievable using polarization mismatch can be a value between infinity and zero. The theoretical polarization mismatch loss, $\chi$, can be calculated for two widely separated elliptically polarized antennas in freespace using the following relationship:

$$\chi = -10 \log_{10}\left\{ 1/2 + 1/2\left[\frac{4\gamma_T\gamma_R + (1-\gamma_T^2)(1-\gamma_R^2)(\cos 2\beta)}{(1+\gamma_T^2)(1+\gamma_R^2)}\right]\right\}$$

where:

$\gamma$=ellipticity ratio, the signed voltage ratio of the major axis of the polarization ellipse to its minor axis, $(1 \leq |\gamma| \leq \infty)$.

$\beta$=polarization mismatch angle, $(0° \leq \beta \leq 90°)$.

T=transmit; R=receive.

The polarimeter implementation utilized within the invention effectively modulates the orthogonal received components of both the interference signals and the GPS signals and via a detection and closed loop control creates a polarization mismatch against the interference signal in the signal path to the GPS receiver.

Figure 2C:
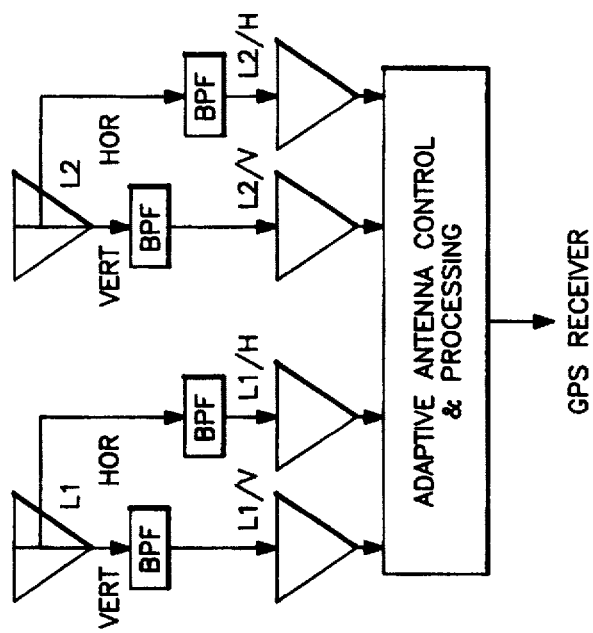
FIGS. 2A-2F show various alternate implementation approaches possible for the invention based on representative applications for GPS receivers and GPS accuracy requirements. The FIGS. illustrate three categories of implementation: a single ortho antenna configuration; dual ortho antenna configurations; and dual antenna ortho bi-frequency antenna system configurations.
Figure 2B:
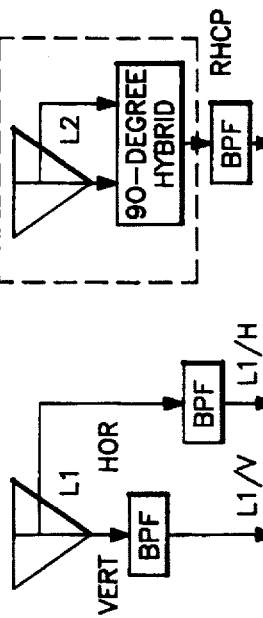
Figure 2A:
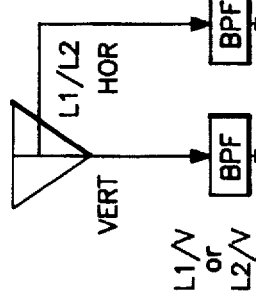
Figure 2E:
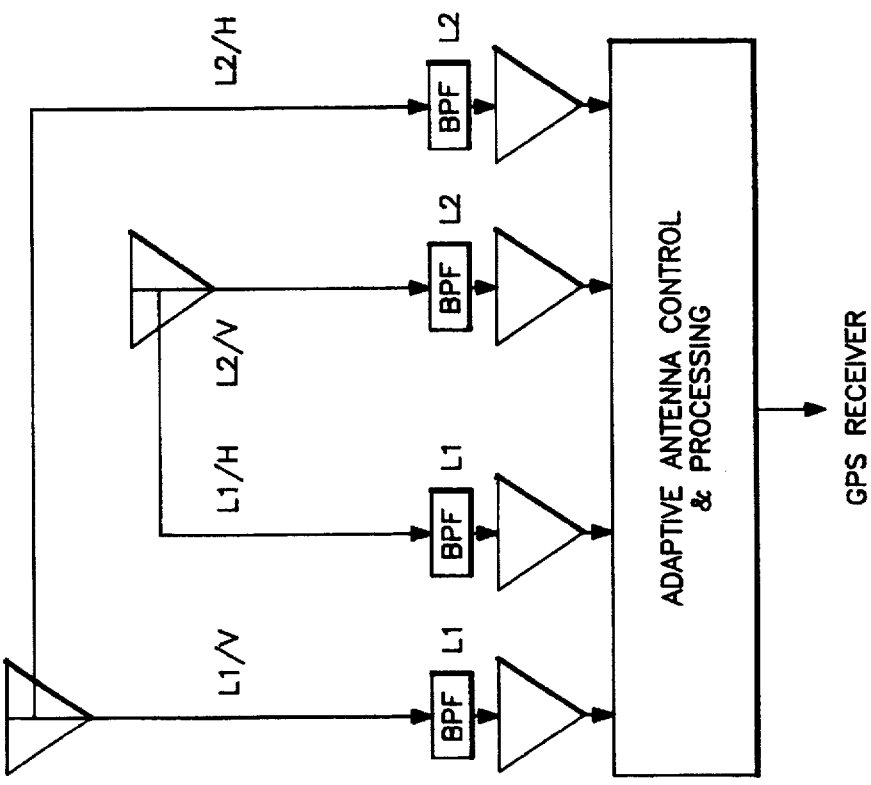
Figure 2D:
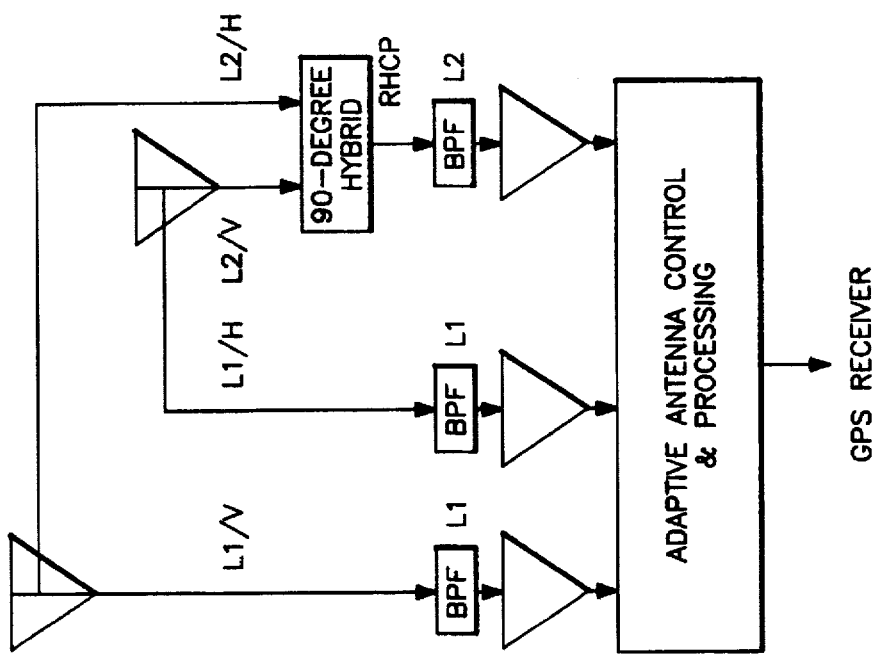
Figure 2F:
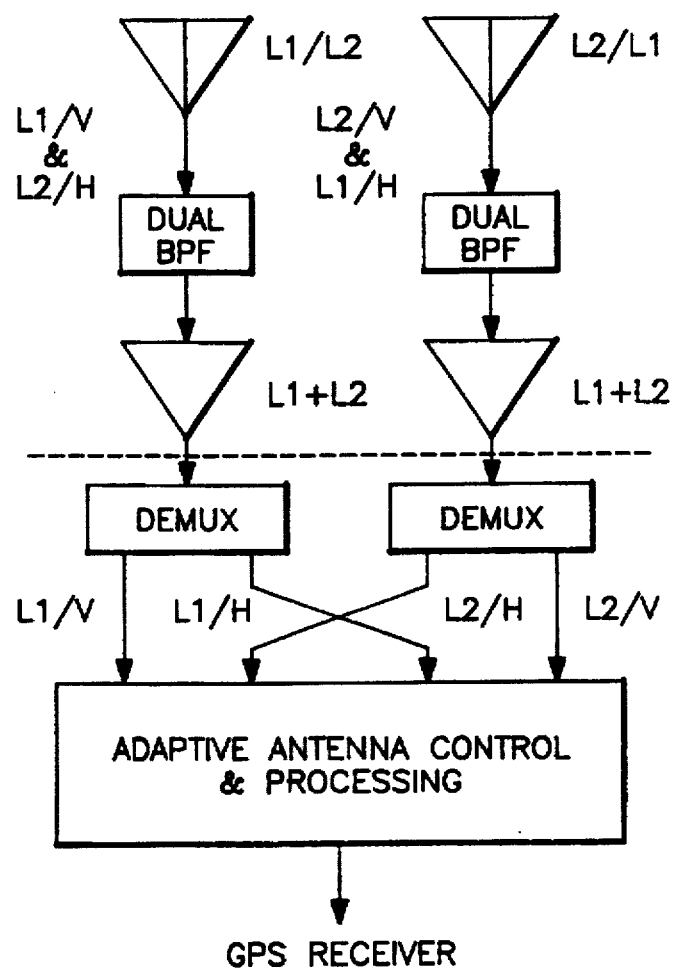

FIGS. 2A–2F show various alternate implementation approaches possible for the invention based on representative applications for GPS receivers and GPS accuracy requirements. The FIGS. 2A–2F illustrate three categories of antenna and interface implementations: (a) a single ortho antenna configuration (FIG. 2A) that can be applied to the L1 or L2 band where a single channel of nulling is implemented in either L1 or L2 bands; (b) the dual ortho antenna configurations (FIGS. 2B and 2C) using an implementation where separate L1 and L2 band antennas process the orthogonal received signals in each band for L1 hulling/cancellation and L2 bypass (FIG. 2B), and an implementation where separate L1 and L2 band antennas process the orthogonal received signals in each band for individual L1 and L2 nulling (FIG. 2C); and (c) the dual antenna ortho bi-frequency antenna system configurations (FIGS. 2D–2F) using implementations where a pair of bi-frequency antennas furnish the orthogonal electrical components of the L1 and L2 bands having higher cross-polarization isolation and where the orthogonal received signals in each band are used for L1 hulling/cancellation and L2 bypass (FIG. 2D), a second implementation where the orthogonal L1 and L2 band signals are processed in each band for individual L1 and L2 hulling (FIG. 2E), and a third (minimum interface) implementation where a pair of bi-frequency antennas furnish the combined sum of the orthogonal components of L1 and L2 bands whereby the signals are frequency multiplexed in each patch antenna by virtue of the antenna feed position (FIG. 2F).

FIG. 3 depicts one preferred embodiment of a single channel dual ortho antenna configuration for nulling of L1-band (or L2-band) interference only. The antenna system 5 provides vertically and horizontally polarized signals VP, HP to the adaptive antenna feed system 7. The antenna system 5 includes an antenna(s) 25 which may be either a pair of L1 dipoles oriented for orthogonal operation, or one L1 microstrip patch antenna with vertical and horizontal ortho feed. Patch antenna configurations are generally known in the art. Alternatively, the antenna 25 may be the novel bi-frequency antenna of FIGS. 5 and 6 which provide the L1 vertical and horizontal components for each channel. The antennas 25 receive or detect the L1 (or L2) GPS signals along with any inband interference signals. The detected vertical and horizontal components pass through band-pass filters 27, 29 and pre-amplifiers 31, 33 to provide the VP and HP signals.

Illustrated in FIG. 3 is the polarimeter architecture (sometimes referred to as a gamma/phi modulator) 35 of the feed system 7, whereby the unequal phase (or delay) of the received ortho signals VP, HP are first adjusted for tilt (phi) to relative quadrature by variable phase control circuits 37, 39 acted upon by adaptive phase controller 41 of the adaptive control circuit 17, and then combined in the first hybrid junction 43. The unequal phase (or delay), or phase shift of the received ortho signals VP, HP result from the relationship of the two received signal components and by unequal delays in the transmission lines and networks between the antennas 25 and the polarimeter 35. The output signals of the first hybrid 43 are theoretically equal in amplitude. The outputs 43a, 43b of the first hybrid 43 are adjusted in relative phase by variable phase control circuits 45, 47 acted upon by adaptive phase controller 49 of the adaptive control circuit 17 and then combined in the second hybrid 51 to produce a minimum null at the difference output port 53 that is effectively, or desirably, the null of the interference signal. The second output 55 of the hybrid 51 is a summing port 55 and concurrently produces a maximum output. Balanced varactor phase shifter arrangements, described below, are used in each leg of the gamma (45, 47) and phi (37, 39) modulation process to provide matched operation over frequency and power. The difference (or delta) and summing (or sigma) outputs 53, 55 of the second hybrid junction 51 are detected, processed by the interference detection receiver circuit, or receiver processing circuit, 15, and used to adaptively generate loop control signals for tilt and ellipticity (or gamma/phi) modulations by adaptive control circuit 17. The control loop compensates the system for installation variations, apparent interference signal changes, and for component unbalances. The null or difference output 53 of the second hybrid 51 is also provided to the GPS receiver, via a power coupler 9, as an input 13 with the interference signal suppressed.

Figure 5:
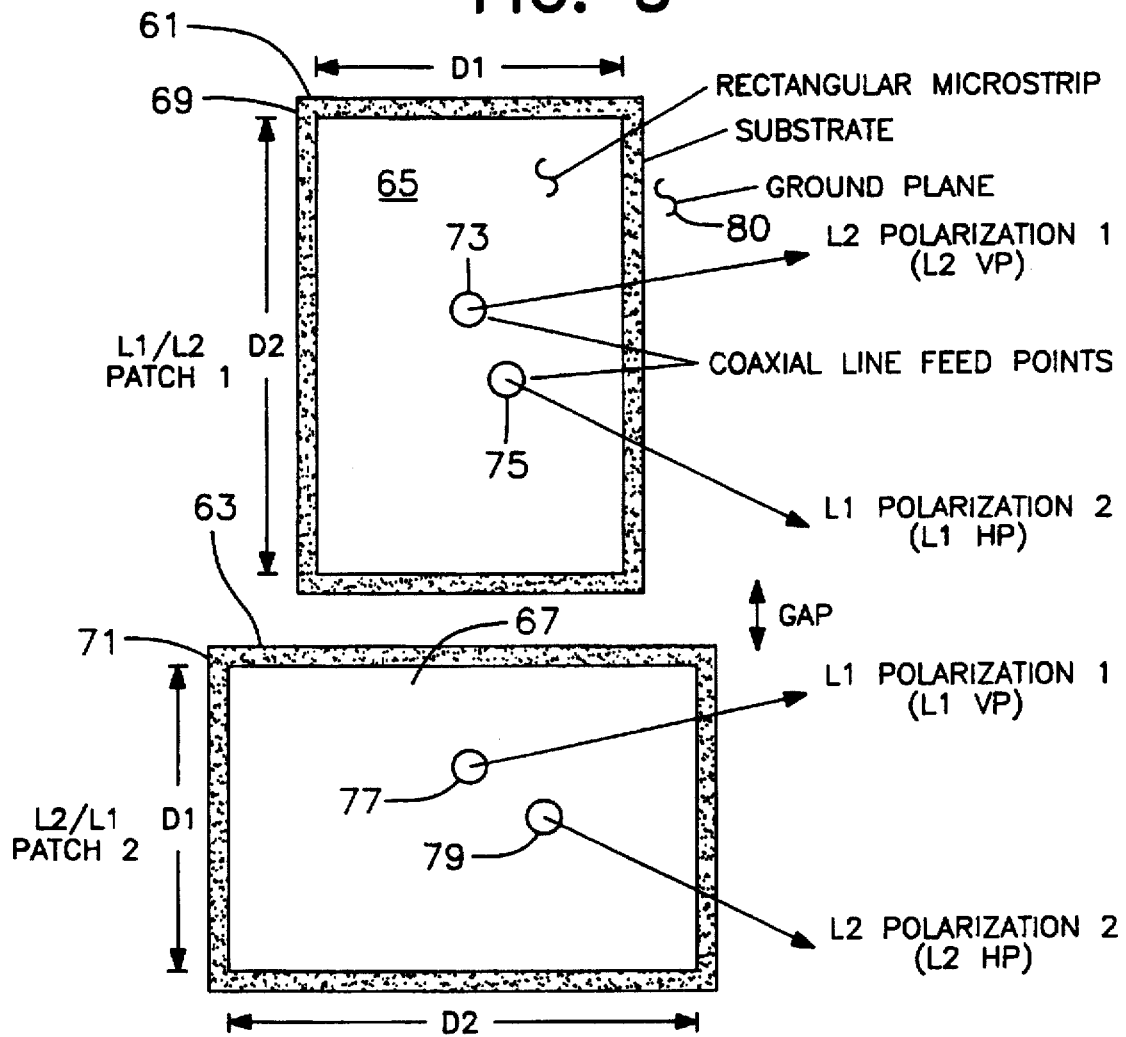
FIG. 5 illustrates the structure of the ortho bi-frequency patch antenna showing two rectangular microstrip patches (not drawn to scale) in an orthogonal arrangement with independent L1 and L2 orthogonal feeds.

FIG. 5 shows the structure of a dual ortho bi-frequency patch antenna showing two rectangular microstrip patches 61, 63 in an orthogonal arrangement. The dimensions D1 and D2 of the two microstrip patches, 61 and 63 are the same for each patch and are selected to optimally receive the L1 and L2 bands with orthogonal linear polarizations, respectively, i.e. D1 approximately equals $\lambda_{1d}/2$, D2 approximately equals $\lambda_{2d}/2$, where $\lambda_{1d}$ and $\lambda_{2d}$ are the signal wavelength for L1 and L2 in the antenna dielectric, D1 is one dimension of each patch, and D2 is the second orthogonal dimension of each patch, as will be discussed further below. The patch antennas 61, 63 may be located on a single printed circuit board. Patch antenna configurations are well known in the art and generally comprise a conductive portion 65, 67 overlying an electrically thin dielectric substrate portion 69, 71 overlying a conductive Found plane 80 with feeds or probes connected with the conductive portions. In the present invention, the feed or probe locations of the patches are selected to provide optimum linear signal coupling and cross-polarization isolation. In this embodiment, four (4) feed locations 73, 75, 77, 79 are used to independently provide the L2/V, L1/H, L1/V and L2/H polarization (P) electrical signals.

Figure 6:
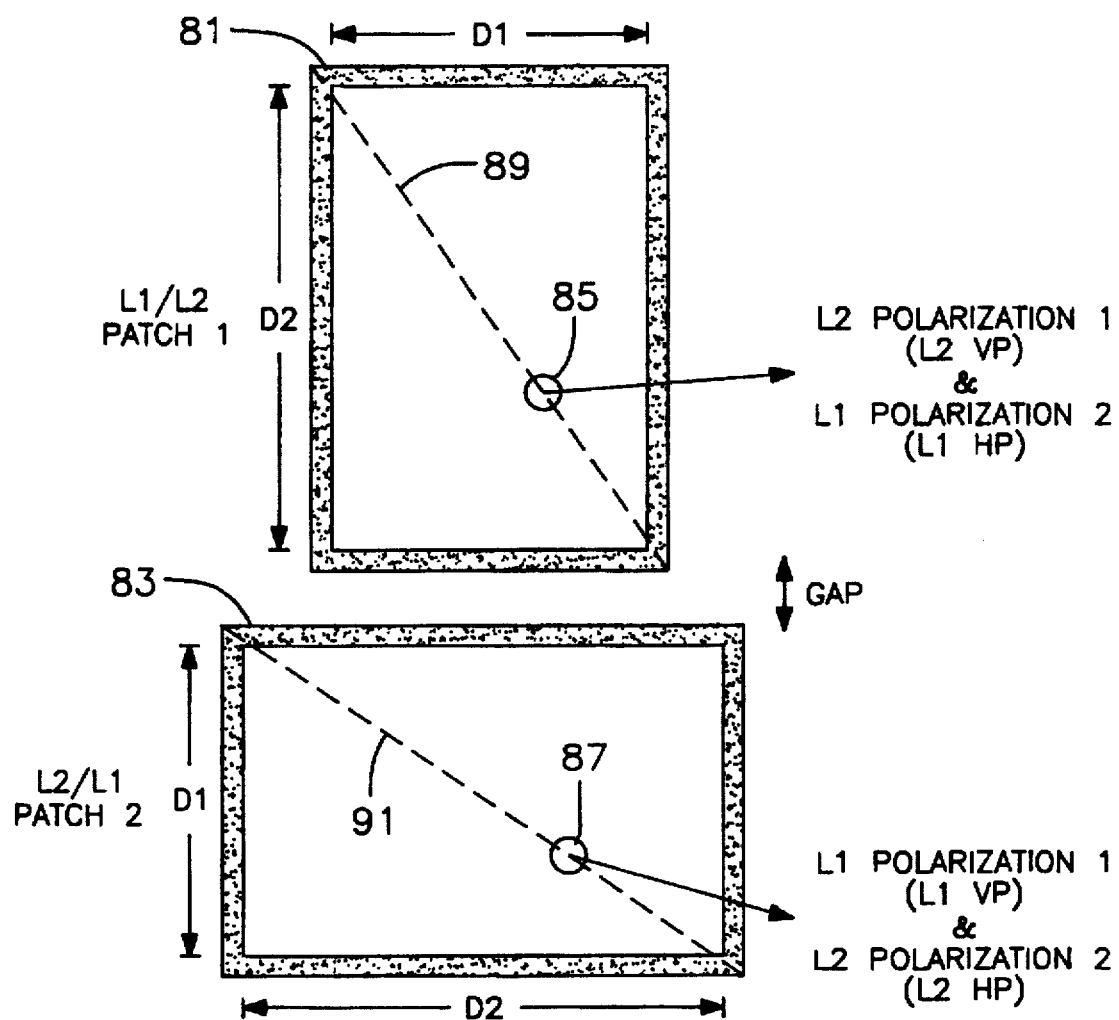
FIG. 6 illustrates the structure of an ortho bi-frequency patch antenna showing two rectangular microstrip patches (not drawn to scale) in an orthogonal arrangement with frequency multiplexed L1 and L2 orthogonal feeds.

FIG. 6 shows an alternate structure for a dual ortho bi-frequency patch antenna showing the two rectangular microstrip patches 81, 83 in an orthogonal arrangement. The dimensions and orientation of the two microstrip patches, 81, 83, are the same as discussed above using a novel feed arrangement selected for frequency multiplexer operation. The feed or probe locations 85, 87 are located along the diagonals 89, 91, or diagonal regions, of each patch and are selected to provide optimum combined signal coupling and cross-polarization isolation for L1 and L2 signals. Two feed locations 85, 87 are used to simultaneously provide frequency multiplexed L2/V and L1/H, and L1/V and L2/H polarized electrical signals. This arrangement allows a simpler cable interface.

The antenna approach for the preferred embodiment of the GPS interference suppression system uses the half-wavelength microstrip rectangular element design. (Current art microstrip antenna element techniques include half-wavelength, quarter-wave, and full-wavelength element designs.) The lengths D1 and D2 of antenna patches 61, 63 (as well as patches 81, 83) are critical dimensions and are slightly less then a half-wavelength in the dielectric substrate 69, 71 material:

$$D=0.49\lambda_d=0.49\lambda_0/(\epsilon_r)^{1/2}$$

where D (D1 and D2)=length of the microstrip element, $\epsilon_r$=relative dielectric constant of substrate, and $\lambda_0$=free-space wavelength for each frequency of interest. Variations in the dielectric constant and feed inductance makes it difficult to predict exact dimensions, so exact microstrip length is determined empirically.

The source of radiation for a rectangular microstrip antenna is the electric field excited between the edges of the microstrip element and the ground plane (excitation of a nearly infinitesimal slot with uniform E field). The fields are excited 180° out of phase between opposite edges. The input impedance of the antenna can be matched by using either a coaxial feed or an edge feed with a quarter-wave transformer. The approximate input edge impedance of a microstrip element is given as $R_{in} \approx 60\lambda_d/W$, where W is the width of the slot. The input impedance in the embodiment is matched to 50Ω impedance by using a coaxial feed. The 50Ω point for the feed is obtained by varying the distance between the feed location and the edge of the element. The impedance of the element at the design frequency and polarization essentially goes to zero at approximately the center symmetry line of the element. Thus, by strategically locating the feeds such that in one dimension they are near the zero impedance location of the element, while in the second dimension they are at the 50Ω location, the result is a pair of ortho feeds. Each candidate feed position for 50Ω impedance is calculated for material properties and roughly located for the element. These values are used as starting points, but exact dimensions are adjusted empirically. Fabrication accuracy, materials consistency and mutual coupling result in small variations over a group of units.

Figure 7:
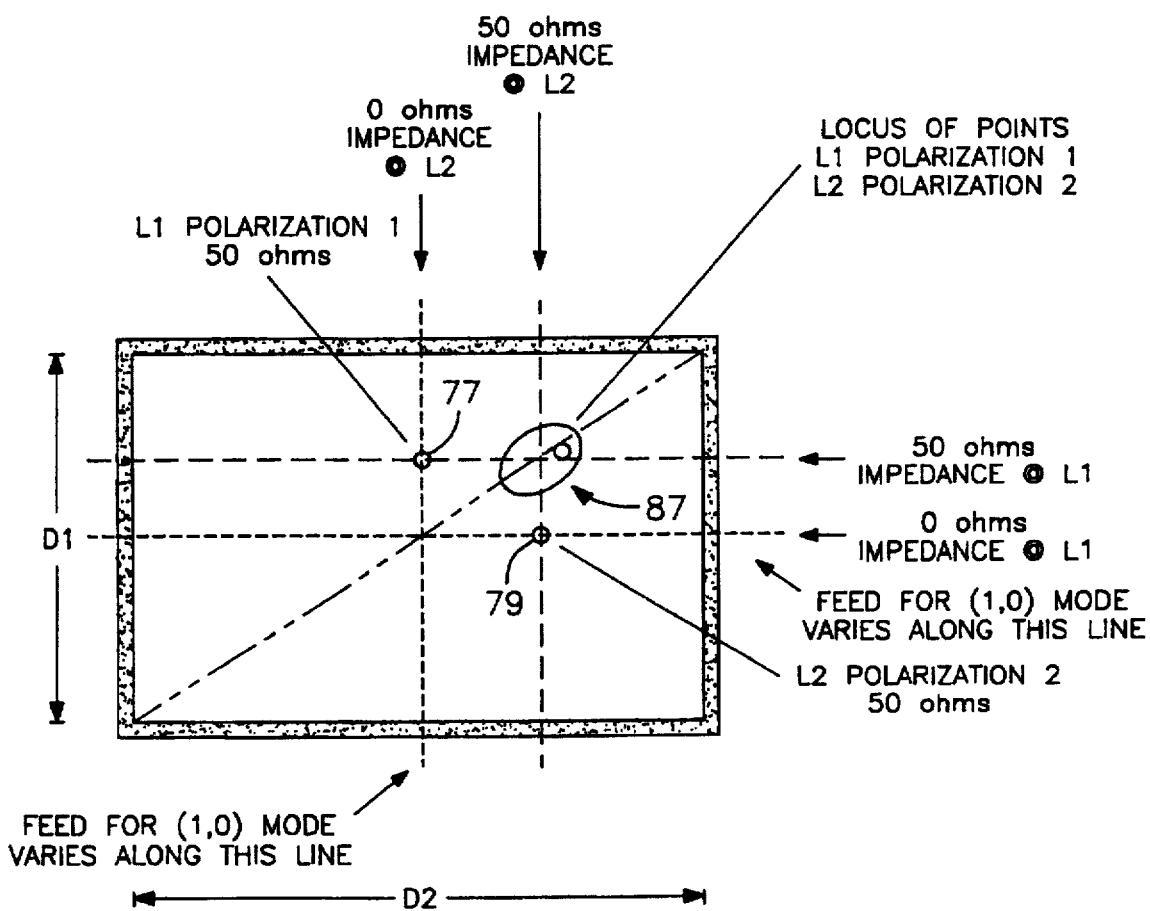
FIG. 7 illustrates the methodology for locating the optimum 50Ω impedance feed ports for the ortho bi-frequency rectangular patch antennas for L1 and L2 orthogonal feeds.

Refer to FIG. 7. The dual-polarization rectangular microstrip element has dimensions selected so that $D_1$ matches the half-wavelength of resonant frequency, L1, and $D_2$ matches the half-wavelength in the dielectric of the second resonant frequency, L2. Each rectangular element in the embodiment can be probed using either a one (1) feed (FIG. 6) or a two (2) independent 50 Ω impedance coaxial feed (FIG. 5) approach near the center of each element. In the two feed per element case, feed$_1$ 77 will receive vertical radiated polarization for L1, and feed$_2$ 79 will receive horizontal radiated polarization for L2, and vice versa in the other element. In the case of a single feed per element, the feed 87 will receive a multiplexer signal composed of the sum of the vertically polarized L1 and horizontally polarized L2, and vice versa in the other element.

The two antenna feed arrangements preferred in the invention are: (a) one using a dual-coaxial approach for linear polarization of the two orthogonal modes of the rectangular patches resonating at two different frequencies (FIG. 5), and (b) a second using a single coaxial frequency multiplexed approach for the two orthogonal linear polarization modes of the rectangular patches (FIG. 6). The first approach, shown in FIG. 5, is a 4-port solution which independently optimizes the input impedance for each frequency and each polarization. The second approach, shown in FIG. 6, is a 2-port frequency multiplexed solution which optimizes input impedances for the two frequencies. Dual-frequency multiplexed operation can be achieved by locating the feed to each patch along a region on the diagonal of the rectangular elements.

The exact dimensions of each element and the feed-point locations are defined empirically using an iterative process. The process consists of building the elements using the defined materials to the dimensions of the design equations for a rectangular microstrip element. The resonant frequency and impedance are measured; usually differing slightly from theoretical predictions because of the combined effects of: dielectric constant variation; impedance variation for non-resonant coupling elements; feed-probe inductance; and mutual coupling. Adjustments to the microstrip element sizes and feed-point locations are made to correct the resonant frequency and feed impedance, respectively. Multiple iterations may be required. Once optimized, microstrip dimensions and feed-probe locations will be consistent (unit-to-unit) based on materials uniformity and fabrication variance.

Feed points are located using the 1-dimensional current distribution of the element at the resonant frequency. The feed input impedance of the antenna varies proportionally with patch current and location. Resonant frequency and pattern of the microstrip element are essentially independent of feed position. The rectangular patch's dimensions are mechanically tuned to resonate at the L1 and L2 frequencies. Patch current distribution is almost sinusoidal in the direction of current and almost uniform, except near the edges, in the direction orthogonal to the current. In practice, a 1-volt source is used to excite the patch using a probe and is moved over the patch orthogonal to the dimension corresponding to the wavelength radiating edges until a point conforming to the admittance of the current for 50Ω is located. Two symmetric 50Ω solutions for each wavelength exist between the center and the edges. Coupling between feeds is minimum due to mode orthogonality.

The polarization of the multiplexed, or diagonally located, feeds is trickier to position. The precise polarization at resonance changes slightly with location and the impedance point has to be systematically adjusted.

The measurements can use either of two test setups: a standard slotted-line; or an automatic network analyzer. The looking-in reflection coefficient versus frequency is measured. The standing-wave ratio magnitude and minimum position relative to the patch are recorded and plotted using a Smith chart. From this reflection coefficient locus, the resonant frequency and power factor of the patch is determined using graphical techniques. The power factor (the reciprocal of the Q) is convenient for resonant circuit representation and analysis. The Smith chart representation shows the admittance locus of the feed versus frequency for the resonant circuit. In order to minimize measurement errors caused by impedance transformation through the coax-to-microstrip transition and transmission line, the input impedance is generally measured for discrete frequencies in a band around the wavelength of interest after calibration of the Smith chart by putting a short circuit at the plane where the line connects to the patch.

Thus, with reference to FIG. 7, the probe or lead locations 77 (L1 polarization 1) and 79 (L2 polarization 2) for the antenna 63 of FIG. 5 is determined as follows: The probe location 77 lies along the O Ω location near the center line for the D2 length and the probe location is moved orthogonally to the D2 direction until the 50Ω impedance is located, as shown. Similarly the probe location 79 lies along the O Ω location near the center line for the D1 length and the probe location is moved orthogonally to the D1 direction until the 50 Ω impedance is located, as shown. The probe or lead locations 73, 75 of the antenna 61 is determined in the same manner.

For the single coaxial frequency multiplexed antenna of FIG. 6, for patch 83, the probe or lead location 87 is at the locus of points where 50 Ω impedance is calculated for each of the L1 and L2 frequencies and essentially at a diagonal or diagonal region.

Figure 8B:
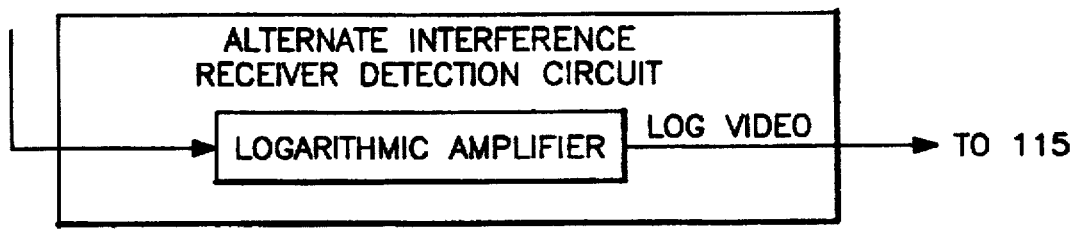
FIG. 8B illustrates an alternative interference receiver detector circuit that may be utilized in the FIG. 8A embodiment.
Figure 8A:
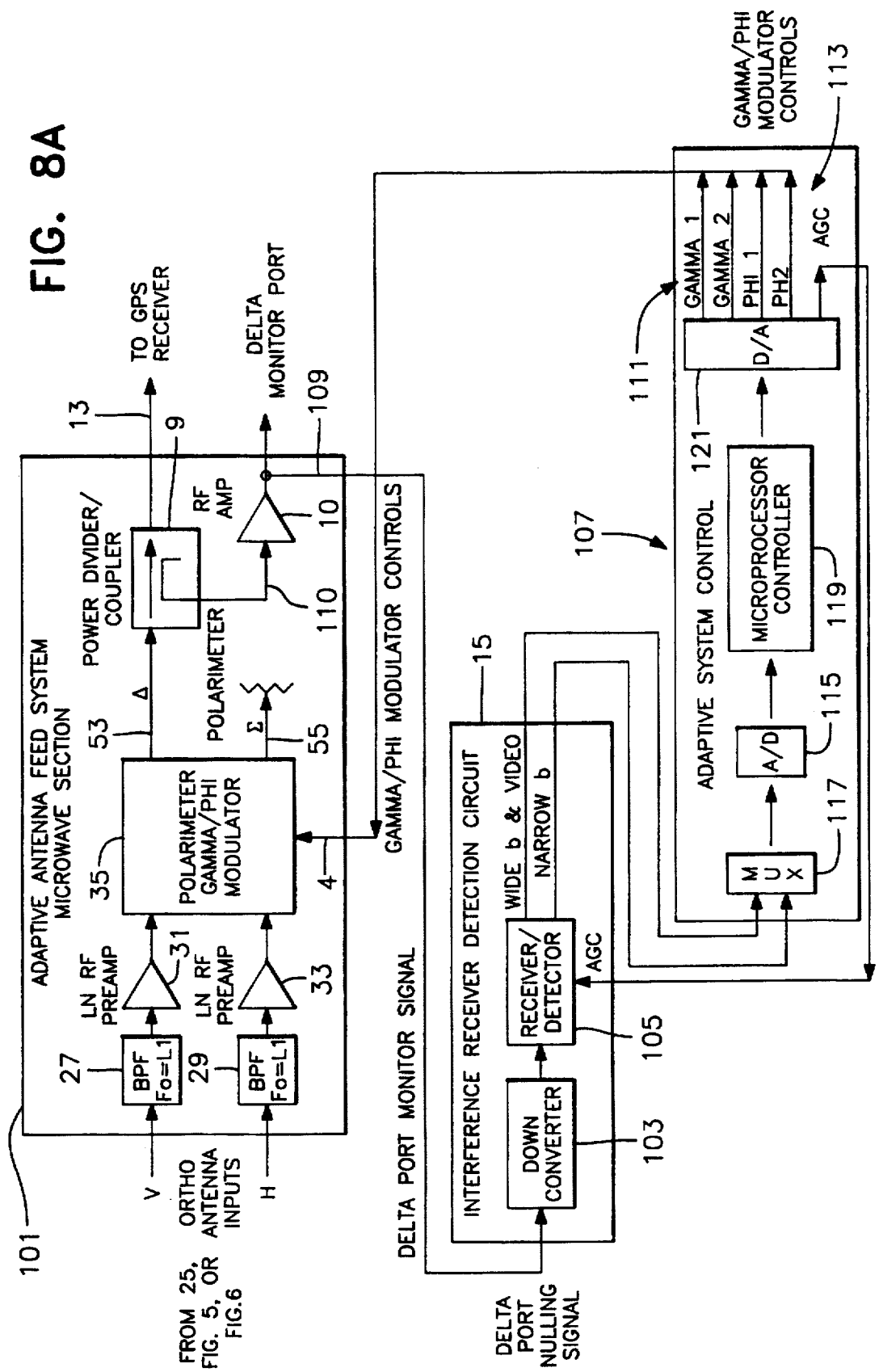
FIG. 8A illustrates the RF block diagram and receiver processing schematic for one channel or loop of interference cancellation.

Refer now to FIG. 8A showing the RF block diagram and receiver processing schematic for one channel implementation of GPS interference cancellation at frequency L1. The illustrated input is a pair of orthogonal RF signals from the antennas 25, or from the antennas of FIGS. 5 and 6. As illustrated in FIG. 1, the cancellation approach is functionally composed of the following: the antenna system 5; the adaptive antenna feed system 7; a power coupler 9; the interference receiver and detection circuit 15; and the adaptive control circuit 17. FIG. 8 further illustrates the hardware partition and fabrication approach of the invention into the following physical units: a microwave section 101; a down converter section 103; a receiver/detector section 105; and a system control section 107. As shown, the down converter 103 and receiver detector channel 105 monitor a coupled delta or difference port 109 of the microwave section 101. The microwave section 101 shown consists of band-pass filters 27, 29 and preamplifiers 31, 33 which interface with the ortho antennas, a solid state polarimeter or gamma/phi modulator 35, a delta port power divider/coupler 9, and a delta monitor port RF amplifier 10. Channel bandwidth and noise figure are set by the arrangement of bandpass filters 27, 29 and low noise RF preamplifiers 31, 33. The filters and preamplifiers are generally located with the antenna (25, FIG. 5, FIG. 6 for example) to compensate for interface separation losses and allow for remote antenna placement The polarimeter modulator or gamma/phi modulator 35 utilizes a 90-degree hybrid architecture, as will be described. Two sets of gamma and phi modulator controls 111, 113 are utilized to control the tilt and ellipticity of the polarimeter 35, and the polarimeter provides a delta 53 and a sigma 55 output port. The sigma output 55 of the polarimeter is terminated and is not used in the system. The delta port output 53 of the polarimeter 35 is sampled in an RF power divider/coupler 9. One output port 13 of the power divider is provided as the input to the GPS receiver and includes the GPS received signals of interest with interference suppressed. The second output port 110 is the null monitor port and is amplified in an L1-band RF amplifier 10 and provided for signal processing and detection and used to adaptively generate null loop control signals for tilt and ellipticity modulation. The interference receiver detection circuit 15, as shown, consists of a downconverter 103 and receiver/detector 105. The signal detection and processing portion of the invention provides dynamic range control via AGC and video detected null signals for system control section processing. The adaptive system control section 107 is digital signal processing composed of the signal A/D converters (ADC) 115 or encoder, via a multiplexer 117, signal processing and loop control algorithm in a microcontroller 119, and control signal D/A converters (DAC) 121 for analog drive to the modulator 35.

The output of the microcontroller and control program/algorithm consist of iterative settings for the AGC amplifier, and (four) gamma/phi phase shift control signals. These signals are D/A converted at 121 and applied to the respective devices as analog control signals to complete loop closure. The control loop and signal processing algorithm compensate the system for apparent interference signal polarization orthogonality, interference signal properties, polarization changes and component unbalance, as will be described. The null output 53 of the second hybrid is provided to the GPS receiver at 13 as an input with the interference signal suppressed.

FIG. 8B depicts an alternative interference receiver detection circuit that is much simpler and preferred. It is essentially a logarithmic amplifier having a log video output provided directly to the A/D converter 115. The alternative circuit reduces the need for AGC.

Figure 9:
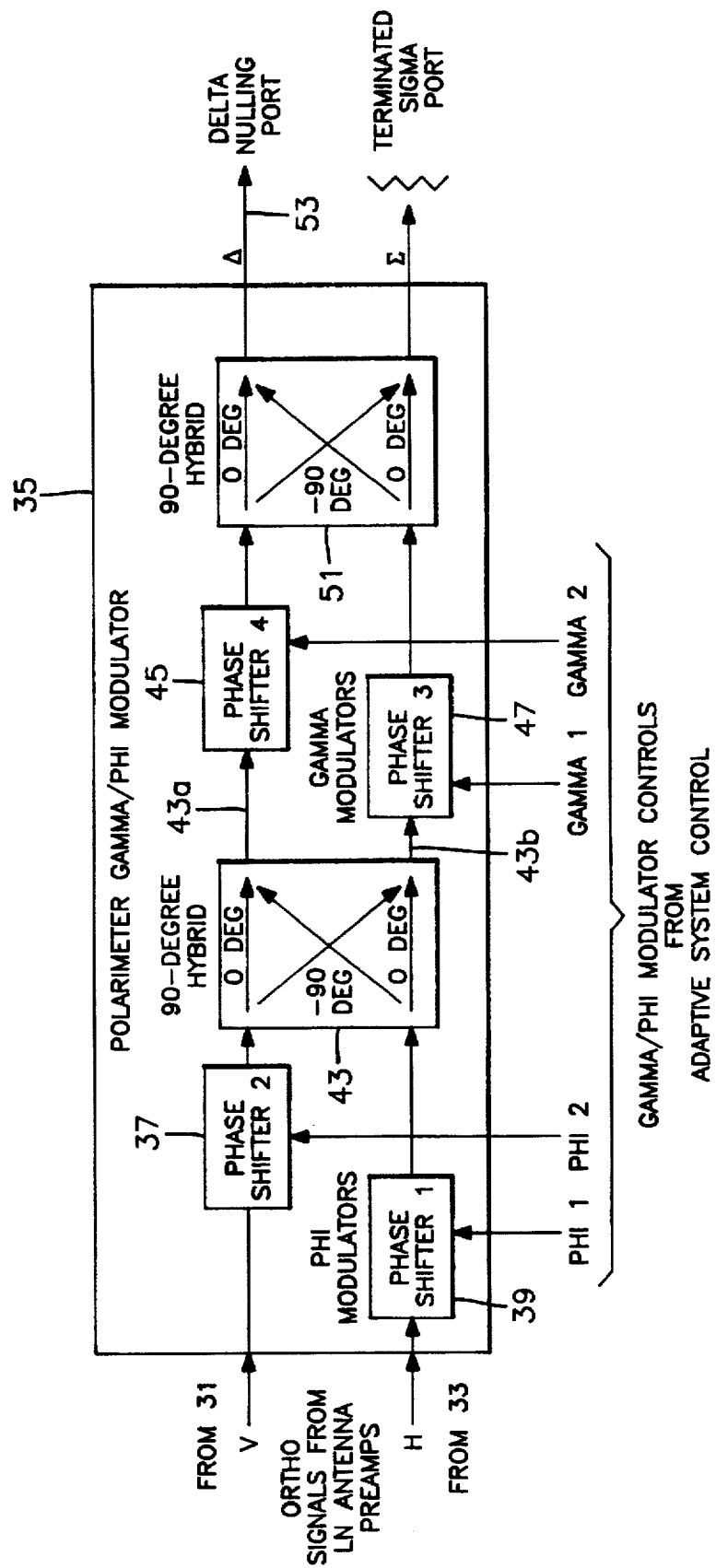
FIG. 9 illustrates the modulator schematic for the polarimeter or gamma/phi modulator portion of the microwave section of the invention.

FIG. 9 shows the detail of the polarimeter modulator 35 used in the adaptive antenna feed system 7. The modulator shown utilizes a 90-degree hybrid architecture. The polarimeter is composed of two 90-degree hybrid junctions 43, 51 and two pair of gamma 45, 47 and phi 37, 39 phase shift modulators. Each phase shifter is adjustable over a minimum 0–180 degree range. The first pair of balanced RF phase shifters 37, 39 is located in the ortho lines from the antenna prior to the first 90-degree hybrid 43 and sets the tilt angle, or phi, of the polarimeter 35. For a voltage null or signal minima, these phase shifters are set to relative quadrature and compensate for phase and delay unbalances in each leg of the antenna's orthogonal paths, as well as imbalances and imperfections in subsequent hybrids and modulators. The phase shifter output signals from 37, 39 are combined in the first hybrid junction 43. The output signals of the first hybrid 43 are each theoretically equal in amplitude (i.e. the difference in amplitude is at a minimum). The outputs 43a, 43b of the first hybrid 43 are adjusted in relative phase by the second pair of balanced phase shift modulators 45, 47 and combined in the second 90-degree hybrid 51 to produce a voltage null or signal minima at one output port 53 of the hybrid, termed the delta port, that is effectively the voltage null of the interference signal. The second pair of RF phase shifters 45, 47 set the ellipticity, or gamma, of the polarimeter 35. The alternate output of the second hybrid, termed the sigma port, concurrently produces a voltage peak or maxima output. Balanced varactor phase shifter arrangements, to be described, are used in each leg of the gamma and phi modulation process to provide matched modulator operation over frequency and signal level The delta port output 53 of the second hybrid junction 51 is power divided in an RF power divider/coupler 9.

The polarimeter, or gamma/phi modulator, may be further described, as follows. Assume that the orthogonal VP and HP components may be represented by $E_1 \cos \omega t$ and $E_2 \cos \omega t + \alpha$. The phase shift a between $E_1$ and $E_2$ represents the net phase difference introduced into an orthogonally polarized system by the relationship of the two received signal elements and by unequal delays in the transmission lines and networks between the antenna(s) and the polarization unit. The phi phase shifters 37, 39 adjust the components so that α is cancelled. The outputs of the first hybrid 43, on 43a and 43b are roughly equal in amplitude with opposite phase angles with respect to $(E_1-90°)$ and $E_1$. The gamma phase shifters 45, 47 adjust the signals at 43a, 43b so that they become 90-degrees apart and the second hybrid junction 51 further shifts and combines the inputs thereto so that they are 180-degrees out of phase, thereby producing a zero null. In an actual system, the phase shifts phi and gamma are adjusted to compensate for unbalances in the system to produce a minimum null signal at the delta port. The adjustment of the phi from its nominal value effectively compensates for the mismatch condition to produce a minimum null at delta port 53. The adjustment of the angle gamma effectively compensates for amplitude imbalances to produce a minimum null at delta port 53.

Figure 10:
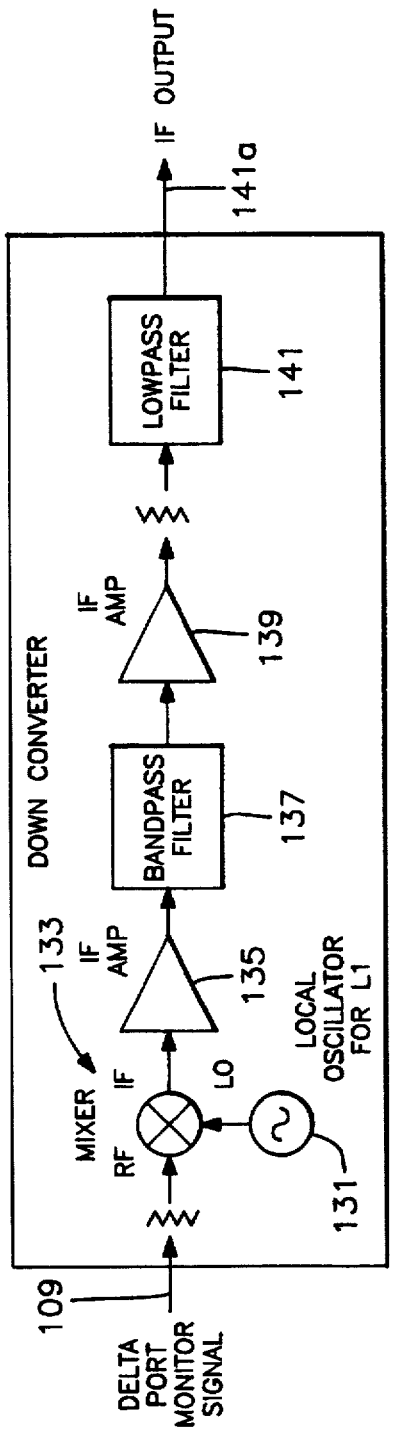
FIG. 10 illustrates the down converter schematic for a superheterodyne interference receiver/detector circuit.

FIG. 10 shows the downconverter 103 schematic. The diagram illustrates the local oscillator 131, a single sideband image rejection mixer 133 and IF amplifier 135 configuration, a bandpass filter 137 at IF, a second IF amplifier 139, and a lowpass filter 141. The downconverter uses a local oscillator (LO) 131 at 1,586 Mhz and converts L1 to a 10 Mhz IF with 2 MHz bandwidth using a single sideband mixer configuration. The IF output goes through a bandpass filter 137 and is amplified in a second IF amplifier stage 139 and lowpass filtered 141 to set the receiver dynamic range.

Figure 11:
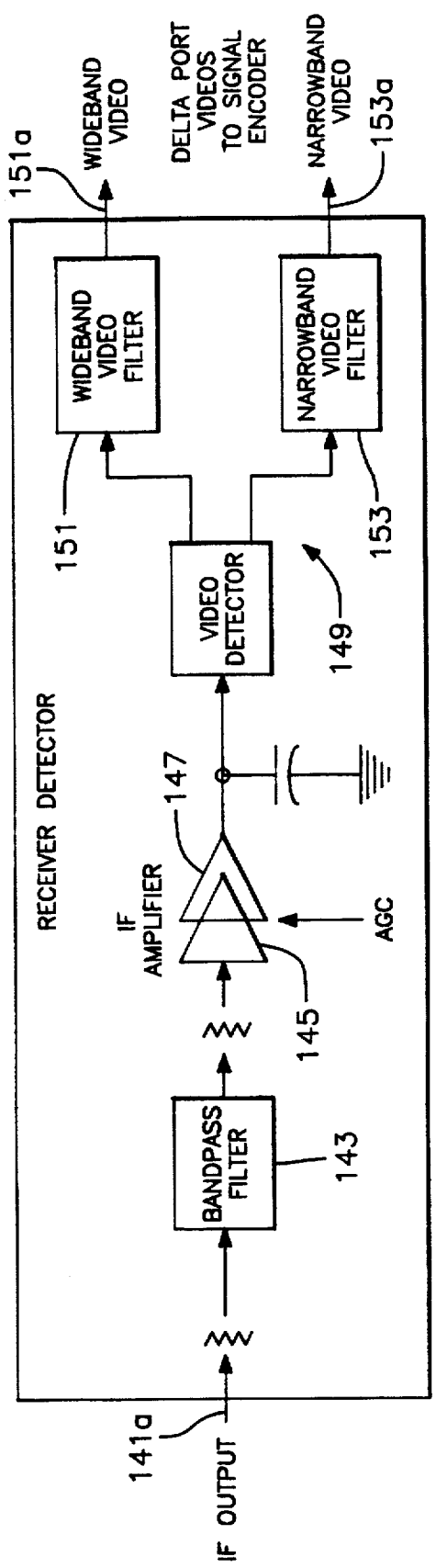
FIG. 11 illustrates the IF amplifier and video detection schematic for a superheterodyne interference receiver/detector circuit.

Refer now to FIG. 11 showing the receiver/detector 105 schematic. The diagram illustrates the downconverter signal as an input to a 2 MHz bandpass filter 143 at 10 MHz, an Automatic Gain Control (AGC) controlled linear IF amplifier 145, a gain/driver amplifier 147, video detection stage 149 with separate wideband and narrowband video filters 151, 153. AGC is used in the linear scheme to obtain sufficient dynamic range to process the extent of anticipated interference signals. Both wideband and narrowband detected video signals 151a, 153a are A/D converted and processed by the acquisition and tracking algorithm in a microcontroller 119.

Figure 12:
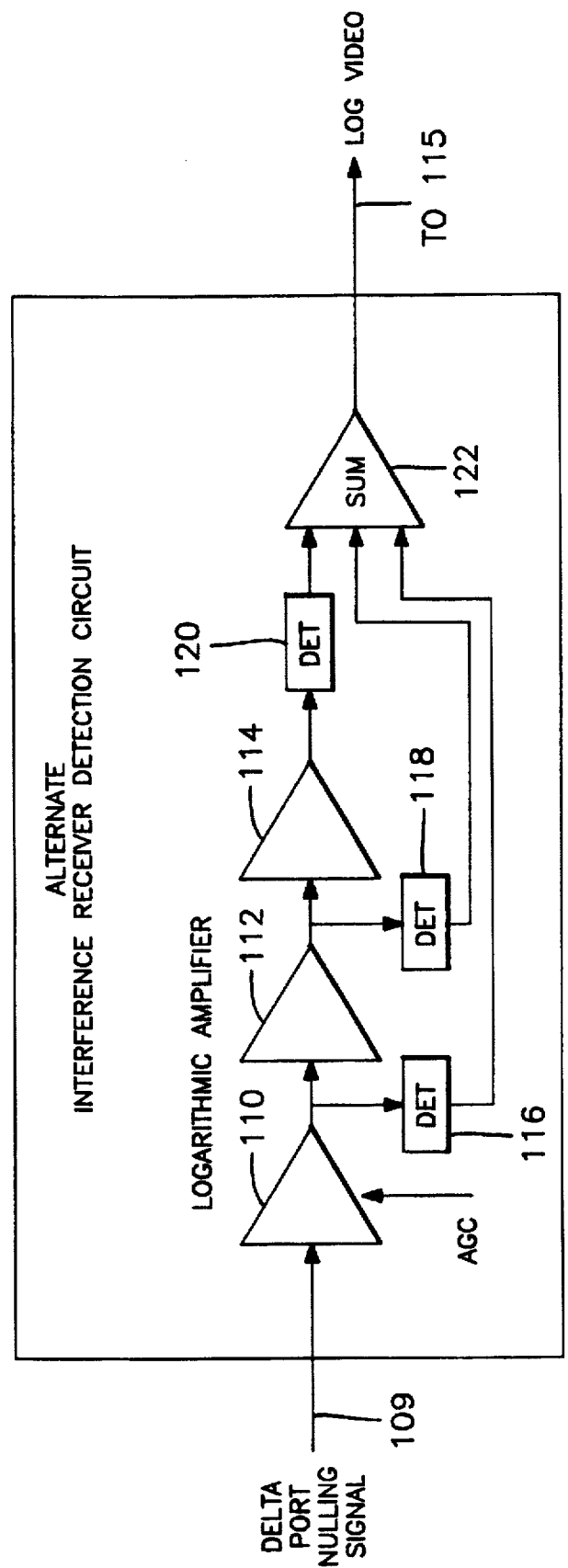
FIG. 12 illustrates a logarithmic amplifier schematic for the interference receiver/detector circuit of FIG. 8B.

Refer now to FIG. 12 showing an alternative logarithmic or exponential IF amplifier approach (see FIG. 8B) which is advantageous since it obtains the needed dynamic range using no AGC, or a small AGC range. This arrangement includes three cascaded stages of amplifiers 110, 112, 114 with three detectors 116, 118, 120 that are summed via 122 and provided directly to the A/D converter 115. This logarithmic amplifier improves interference receiver and detection performance by expanding operating dynamic range for interference and null detection.

Modifications on the invention may include asymmetric gamma/phi phase shifter organization for a simplified modulator arrangement; and a 180-degree/90-degree hybrid polarimeter architecture.

Figure 13:
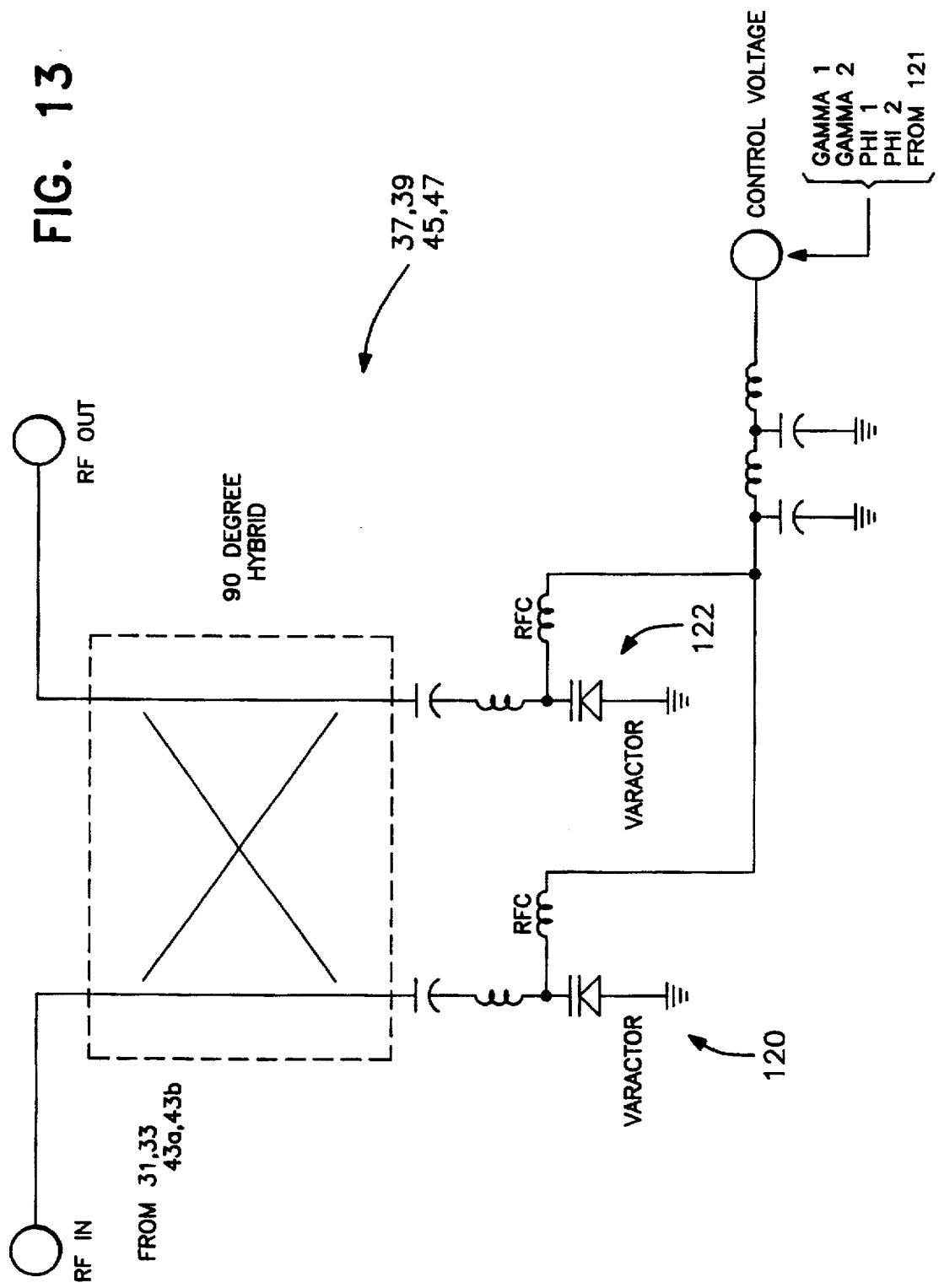
FIG. 13 illustrates the varactor controlled phase shifters of the polarimeter modulator of FIG. 9.

Refer now to FIG. 13 showing a variable varactor controlled analog phase shifter schematic portion of the RF polarimeter 35. The variable phase shifter structure is used for each of the four 0-180 degree balanced gamma/phi modulators 37, 39, 45, 47 in the polarimeter 35. The schematic diagram illustrates a reflective hybrid implementation using two varactor tuned phase shifter diodes 120, 122 which produce a variable transmission line phase shift with constant time delay. The phase shift is twice the electrical length through the varactor to ground. The control voltage inputs are the gamma and phi voltages from digital to analog converter 121.

Figure 14:
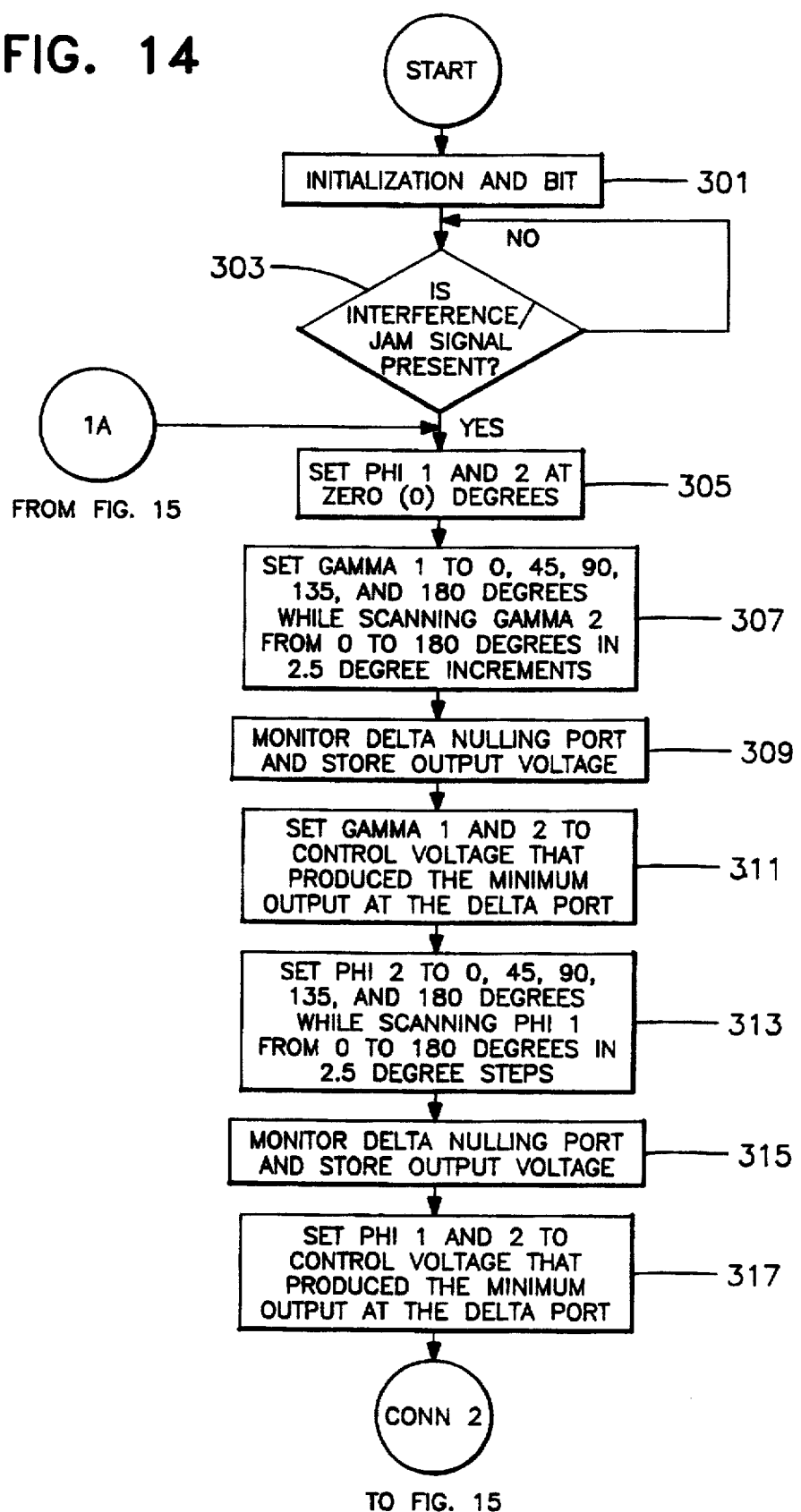

FIGS. 14–16 are flow charts describing the steps utilized by the microprocessor controller 119 for detecting and cancelling interference and/or jamming signals. As will be described, the basic system steps include a preliminary built-in-test loop, a phase scan to determine interference signal presence, a coarse and fine loop to cancel and dose on interference, and a maintenance procedure to detect and adjust the interference null to changes. Detection of interference is based on exceeding a jam or interference threshold. The algorithm coarsely adjusts the polarimeter to null the interference signal, followed by a fine adjustment of the polarimeter to maximize the null to the GPS receiver. The coarse scan utilizes a phase resolution commensurate with the size and shape of the achievable null phenomena and the spectral/temporal properties of the interference signal.

The microprocessor 119 monitors the difference or delta port 53 via the power divider 9 and the RF amplifier 10. This delta nulling port signal over line 109 is processed by the receiver detection circuit 15 and converted to digital form through the analog to digital converter 115. As shown in FIG. 14, the first step, as is conventional, is an initialization and BIT (built-in test) step to verify the DC voltages applied to the various circuit boards and to determine that the analog-to-digital and digital-to-analog converters are operational, and any other initialization that may be required, as functionally depicted in block 301. The system then determines if an interference or a jam signal is present (block 303). The presence of an interference or jam signal is determined by looking at the magnitude of the voltage of the delta port nulling signal (over line 109, as processed) to determine if the voltage is above a predetermined voltage threshold for normal GPS signals. If the voltage is above the predetermined threshold, interference or jamming is determined to exist. If interference and/or jamming is detected, the phi 1 and phi 2 phase shifts for phase shifters 39, 37 are set at zero degrees (block 305). This is done by setting the control voltage to the phase shifters 39, 37 (see FIG. 13) to a predetermined voltage that corresponds to zero degrees. Typically, there is a linear relationship between the control voltage and the amount of phase shifting, which is determined empirically.

After phi 1 and phi 2 for phase shifters 39 and 37 are set to zero degrees, the gamma 1 signal to phase shifter 47 is sequentially set to 0, 45, 90, 135, and 180 degrees and for each setting, the gamma 2 input to phase shifter 45 is scanned from 0 to 180 degrees in 2.5-degree increments. At each scan point, the delta port nulling signal is monitored and the output voltage is stored at each scan point (block 309). After this scanning is complete, the gamma 1 and 2 control voltages are provided to phase shifters 47 and 45 to set the control voltages to levels that produced the minimum output at the delta port (block 311).

Next, the phi 2 voltage signal to phase shifter 37 is repetitively set at 0, 45, 90, 135, and 180 degrees and, at each setting, the phi 1 control voltage to phase shifter 39 is scanned from 0 to 180-degrees in 2.5-degree steps (block 313). Again the delta port hulling signal is monitored at each setting and the output voltage is stored (block 315). Then, the phi 1 and phi 2 control voltages are provided to phase shifters 39 and 37 to voltage levels that produced the minimum output at the delta nulling port (block 317).

Continuing on to FIG. 15, the system continues by setting an alpha and rho value of 22.5 and 0.35 respectively (block 319). A fine tuning routine is then called (block 321) as shown in FIG. 16. The fine tuning routine scans gamma 1 i.e. provides control voltages to phase shifter 47 over a range from alpha degrees below to alpha degrees above the current setting of gamma 1 in rho degree increments (block 401). During this scan, the delta nulling port is monitored and the output voltages are stored at each scan point (block 403). The system then determines the control voltage settings for gamma 1 that produce the minimum output at the delta port (block 405). Gamma 1 is then set to this control voltage (block 407). The system then scans or sets phi 1 from alpha degrees below to alpha degrees above the current setting of phi 1 and scans or incrementally sets the control voltage in rho degree increments (block 409). During this scanning, the delta nulling port is monitored and the output voltage is stored for each scanned point (block 411). The system then determines the control voltage setting for phi 1 that produced the minimum output at the delta nulling port (block 413). Phi 1 is then set to this control voltage (block 415). The fine tuning routine is then completed and there is a return to block 321 of FIG. 15.

At this point, the values for alpha and rho are reset to 11 and 0.044, respectively (block 323). Then the fine tuning routine of FIG. 16 is again called and the fine tuning routine is repeated for the new values of alpha and rho (block 325) in the same manner as was described above.

At this point, it is understood that the phase shifters have been set so as to produce a minimum output signal at the delta port representative of the GPS signal with the interference removed or suppressed. The system continues to monitor the nulling port output to determine the signal level (block 327). The system determines whether the interference or jam signal has been cancelled by determining if the delta hulling port output voltage moves a predetermined amount higher than the set minimum (decision block 329). If a voltage change has occurred, the system then determines if a new jam or interference signal is present or changed (decision block 331). If it has been changed, a return is made to block 305 of FIG. 14 to begin a new search for a minimum output at the delta port.

If the jam or interference signal has not been cancelled (decision block 329) but there has been a voltage change, the fine tuning continues by returning to decision block 323. For example, let us assume that the delta hulling port output voltage is at a minimum value of 100 mv, typical for GPS signals. Let us also assume the system and GPS receiver are on a moving vehicle such as a truck. If the truck moves, the phase shifting may occur due to truck motion which will result in the delta hulling port signal changing due to phase shifts. However, the change is not normally in excess of a predetermined value. For example, by a movement of the receiver, the output voltage may change from 100 millivolts to 1 volt. If only this "small" change occurs, (decision block 329), the fine tuning routine is again called but at the "finer" alpha and rho values (block 323) to continually change the phase shift signals to maintain a minimum or null voltage at the delta port. On the other hand, if the level of the delta port signal becomes significant or "large" (as determined in decision blocks 329, 331) such as the 100 millivolt signal rising to, say, 5 volts, it is determined that a new jam or interference signal is present and the overall system starts anew beginning at decision block 305.

The specific numerical values for the incremental phase shifts and alpha and rho, described above, may be changed. The values provided are exemplary only.

Figure 4:
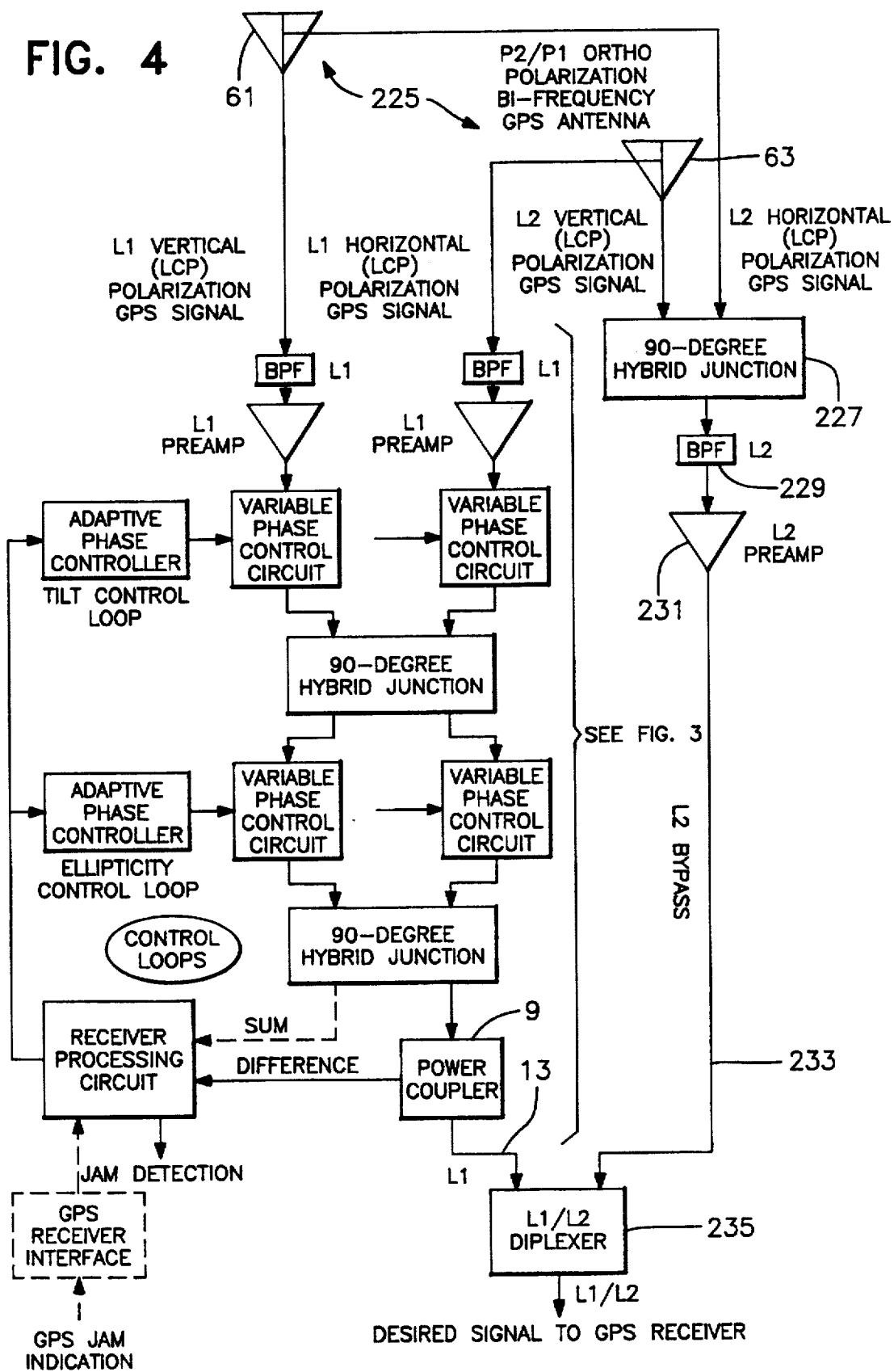
FIG. 4 illustrates a second preferred embodiment utilizing a dual ortho antenna bi-frequency configuration for nulling of L1 interference and L2 bypass.

Reference is now made to FIG. 4 showing a second preferred embodiment of the invention utilizing a dual ortho bi-frequency antenna configuration for nulling of L1 interference and L2 bypass. Illustrated in FIG. 4 is the same polarimeter and control architecture as in FIG. 3. The antenna 225 utilized for the implementation are two rectangular microstrip patches in an orthogonal arrangement such that they receive the L1 and L2 bands with orthogonal linear polarizations, respectively as are shown and described in FIG. 5 (or FIG. 6). In this configuration, the null output of the second hybrid, from power coupler 9, is combined with a RHCP bypass signal generated for L2 band (or the output of a parallel hulling circuit for the L2 band). The L2 vertical and horizontal components from antennas 61, 63 are provided to a 90-degree hybrid junction 227 whereby the orthogonal signal components are combined, then through a band-pass filter 229 at the L2 frequency, through pre- amplifier 231 to produce the L2 bypass signal over line 233. The combined signal output, L1 and L2, is provided to the GPS receiver, via diplexer 235, as an input with the interference signal suppressed.

It should be understood that various other configurations, including, but not limited to the configurations of FIGS. 2A–2F, may be implemented in accordance with the present invention. For example, a configuration, similar to FIG. 4, could be arranged for L2 band interference cancellation with L1 bypass. Moreover, the patch antenna arrangements of FIGS. 5 and 6 may be used with any of the configurations of FIGS. 2A–2F. The patch antenna configuration of FIG. 5, for example, provides for L1 orthogonal vertical and horizontal components and L2 orthogonal vertical and horizontal components and each of these components, or only a set of L1 or L2 components may be needed, depending on the configuration chosen.

We claim:

1. A system for suppressing interference and jamming signals for a global positioning satellite system (GPS) receiver for receiving GPS transmissions in at least one of two L-band frequencies L1 and L2, the system comprising, antenna means for receiving at least one of the GPS L1 and L2 signals and any inband interference or jamming signals and dividing the received signals into two orthogonally polarized antenna output signal components for each of the L1 and L2 frequencies;

polarimeter circuitry connected to said antenna means for receiving the orthogonally polarized antenna output signal components and for shifting the phase of the two orthogonally polarized antenna output signal components to obtain a polarimeter output signal wherein said polarimeter circuitry comprises, a first variable phase shifting stage for receiving the two orthogonally polarized antenna output signal components and for shifting the phase of said orthogonally polarized antenna output signal components in accordance with first phase shift control signals from an adaptive phase control means, a first hybrid junction for receiving the phase-shifted components from said first variable phase shifting stage and for combining the phase-shifted components to produce a pair of first hybrid junction output signals, a second variable phase shifting stage for receiving said pair of first hybrid junction output signals and for shifting the phase of said pair of first hybrid junction output signals in accordance with second phase shift control signals from said adaptive phase control means, and a second hybrid junction for receiving the phase-shifted components from said second variable phase shifting stage and for combining the phase-shifted components to obtain said polarimeter output signal;

adaptive phase control means connected with said first and second variable phase shifting stages for providing first and second phase shift control signals for repetitively adjusting the phase shifting in accordance with the polarimeter output signal until the polarimeter output signal is at a minimum representing at least one of the received L1 and L2 signals with any interference or jamming signals suppressed.

2. The system of claim 1 wherein said first variable phase shifting stage comprises a first pair of variable phase shifters, one of said first pair of phase shifters receiving one of the two orthogonally polarized antenna output signal components and the other of said first pair of phase shifters receiving the other of the two orthogonally polarized antenna output signal components, said first pair of phase shifters shifting the phase of said orthogonally polarized antenna output signal components in accordance with first phase shift control signals from said adaptive phase control means, and wherein said second variable phase shifting stage comprises a second pair of variable phase shifters, one of said second pair of phase shifters receiving one of said pair of first hybrid junction output signals and the other of said second pair of phase shifters receiving the other of said pair of first hybrid junction output signals, said second pair of phase shifters shifting the phase of said pair of first hybrid junction output signals in accordance with second phase shift control signals from said adaptive phase control means.

3. The system of claim 1 wherein said second phase shift control signals from said adaptive phase control means controls said second phase shifting stage to result in the phase-shifted components of said second phase shifting stage having a 90-degree phase difference.

4. The system of claim 3 wherein said second hybrid junction combines the phase-shifted components of said second phase shifting stage so that they have a 180-degree phase difference, the combined resultant being the polarimeter output signal.

5. The system of claim 1 wherein said first phase shift control signals from said adaptive phase control means controls the first phase shifting stage to result in canceling any phase difference between the orthogonally polarized components.

6. The system of claim 5 wherein said first hybrid junction combines the phase-shifted components of said first phase shifting stage such that the difference in amplitudes of the pair of first hybrid junction output signals are at a minimum.

7. The system of claim 1 wherein said adaptive phase control means includes a microprocessor controller for (a) providing a range of phase shift control signals to each of said first and second phase shifting stages to set incremental phase shifts for said phase shifting stages, (b) monitoring and storing the polarimeter output signal for each of the incremental phase shift settings, (c) determining the phase shift settings that result in a minimum value of the polarimeter output signal, and (d) setting the phase shifting stages to the settings where said minimum value was determined.

8. A system for suppressing interference and jamming signals for a global positioning satellite system (GPS) receiver for receiving GPS transmissions in at least one of two L-band frequencies n1 and L2, the system comprising antenna means for receiving at least one of the GPS L1 and L2 signals and any inband interference or jamming signals and dividing the received signals into two orthogonally polarized antenna output signal components for each of the L1 and L2 frequencies;

polarimeter circuitry connected to said antenna means for receiving the orthogonally polarized antenna output signal components and for shifting the phase of the two orthogonally polarized antenna output signal components to obtain a polarimeter output signal, wherein said polarimeter circuitry comprises a first pair of phase shifters for receiving and phase shifting the orthogonally polarized antenna output signal components, a first 90-degree hybrid junction coupled to said first pair of phase shifters, a second pair of phase shifters for receiving and phase shifting the outputs of said first hybrid junction, a second 90-degree hybrid junction coupled to said second pair of phase shifters, wherein said polarimeter output signal is provided at a difference (A) port of said second hybrid junction;

adaptive phase control means connected with said first and second pair of phase shifters for repetitively adjusting the phase shifting in accordance with the polarimeter output signal until the polarimeter output signal is at a minimum representing at least one of the received n1 and L2 signals with any interference or jamming signals suppressed.

9. The system of claim 8, further comprising coupling means for providing the polarimeter output signal to said adaptive phase control means, said adaptive phase control means providing phase shift control signals to each of said first and second pair of phase shifters to shift the phase of the orthogonally polarized antenna output signal components until the polarimeter output signal is at a minimum.

10. The system of claim 8 wherein said adaptive phase control means (a) provides a range of phase shift control signals to each of said first and second pair of phase shifters to set incremental phase shifts for said phase shifters, (b) monitors and stores the polarimeter output signal for each of the incremental phase shift settings, (c) determines the phase shift settings that result in a minimum value of the polarimeter output signal, and (d) sets the phase shifters to the settings where said minimum value was determined.

11. A system for suppressing interference and jamming signals for a global positioning satellite system (GPS) receiver for receiving GPS transmissions in at least one of two L-band frequencies L1 and L2, the system comprising, antenna means for receiving at least one of the GPS L1 and L2 signals and any inband interference or jamming signals and dividing the received signals into two orthogonally polarized antenna output signal components for each of the L1 and L2 frequencies, wherein said antenna means comprises a pair of patch antennas, each patch antenna a conductive portion of rectangular shape and having one length greater than its other length (D2), each patch antenna positioned in non-overlying adjacent relationship and oriented orthogonally with respect to each other such that said one length (D1) of one patch electrode is substantially perpendicular to said one length (D1) of said other patch electrode, each patch antenna having a pair of output leads, wherein each of the orthogonally polarized antenna output signal components of one of the L1 and L2 frequencies is provided on a first output lead from one of the patch antennas and a first output lead from the other patch antenna;

polarimeter circuitry connected to said antenna means for receiving the orthogonally polarized antenna output signal components and for shifting the phase of the antenna output signal components to obtain a polarimeter output signal;

adaptive phase control means connected with said polarimeter circuitry for repetitively adjusting the phase shifting of said polarimeter circuitry in accordance with the polarimeter output signal until the polarimeter output signal is at a minimum representing at least one of the received L1 and L2 signals with the interference or jamming signal suppressed.

12. The system of claim 11 wherein each of the orthogonally polarized antenna output signal components of the other of the L1 and L2 frequencies is provided on a second output lead of said one of the patch antennas and on a second output lead of said other patch antenna.

13. The system of claim 11 wherein each patch antenna conductive portion of rectangular shape is disposed upon a dielectric substrate over a conductive ground plane, wherein said one length (D1) is approximately one-half the signal wavelength for the L1 frequency in the material of the dielectric substrate and the other length (D2) is approximately one-half the signal wavelength for the L2 frequency in the material of the dielectric substrate.

14. The system of claim 13 wherein each patch antenna has a first output lead and a second output lead, said first output lead of said one patch antenna receiving the L1 frequency at a polarization P2 and the second output lead of said one patch antenna receiving the L2 frequency at an orthogonal polarization P1.

15. The system of claim 14 wherein the location of said first output lead on said one patch antenna is the intersection of the zero ohm impedance point at frequency L2 and 50 ohm impedance point at frequency L1, and the location of said second output lead on said one patch antenna is the intersection of the zero ohm impedance point at frequency L1 and the 50 ohm impedance point at frequency L2.

* * * * *